United States Patent
Baker et al.

(10) Patent No.: US 12,079,021 B2
(45) Date of Patent: *Sep. 3, 2024

(54) LOAD CONTROL SYSTEM RESPONSIVE TO THE LOCATION OF AN OCCUPANT AND/OR MOBILE DEVICE

(71) Applicant: Lutron Technology Company LLC, Coopersburg, PA (US)

(72) Inventors: Rhodes B. Baker, Bethlehem, PA (US); Richard S. Camden, Coopersburg, PA (US); Sanjeev Kumar, Harleysville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,072

(22) Filed: Jun. 28, 2023

(65) Prior Publication Data

US 2023/0341882 A1 Oct. 26, 2023

Related U.S. Application Data

(63) Continuation of application No. 17/552,545, filed on Dec. 16, 2021, now Pat. No. 11,726,516, which is a
(Continued)

(51) Int. Cl.
*G05F 1/66* (2006.01)
*H04B 17/318* (2015.01)
(Continued)

(52) U.S. Cl.
CPC ............ *G05F 1/66* (2013.01); *H04B 17/318* (2015.01); *H04W 4/021* (2013.01); *H04W 4/33* (2018.02);
(Continued)

(58) Field of Classification Search
CPC ...... H04B 17/318; H04W 4/33; H04W 4/021; H05B 47/19; H05B 47/195; H04L 12/2803
See application file for complete search history.

(56) References Cited

U.S. PATENT DOCUMENTS

| | | | |
|---|---|---|---|
| 5,248,919 | A | 9/1993 | Hanna et al. |
| 5,905,442 | A | 5/1999 | Mosebrook et al. |

(Continued)

FOREIGN PATENT DOCUMENTS

| | | |
|---|---|---|
| CN | 102293058 A | 12/2011 |
| CN | 102833910 A | 12/2012 |

(Continued)

OTHER PUBLICATIONS

Anagnostopoulos, et al., "Predicting the Location of Mobile Users: A Machine Learning Approach", ICPS '09: Proceedings of the 2009 International Conference on Pervasive Services, Jul. 2009, pp. 65-72.

(Continued)

*Primary Examiner* — Gary Collins
(74) *Attorney, Agent, or Firm* — Michael S. Czarnecki; Glen R. Farbanish; Philip N. Smith

(57) ABSTRACT

A load control system for controlling an electrical load in a space of a building occupied by an occupant may include a controller configured to determine the location of the occupant, and a load control device configured to automatically control the electrical load in response to the location of the occupant. The load control system may include a mobile device adapted to be located on or immediately adjacent the occupant and configured to transmit and receive wireless signals. The load control device may be configured to automatically control the electrical load when the mobile device is located in the space. The load control system may further comprise an occupancy sensor and the load control (Continued)

device may automatically control the electrical load when the occupancy sensor indicates that the space is occupied and the mobile device is located in the space.

42 Claims, 16 Drawing Sheets

Related U.S. Application Data continuation of application No. 16/783,572, filed on Feb. 6, 2020, now Pat. No. 11,204,616, which is a continuation of application No. 15/230,263, filed on Aug. 5, 2016, now Pat. No. 10,599,174.

(60) Provisional application No. 62/201,522, filed on Aug. 5, 2015.

(51) Int. Cl.
*H04W 4/021* (2018.01)
*H04W 4/33* (2018.01)
*H05B 47/19* (2020.01)
*H04L 12/28* (2006.01)
*H05B 47/195* (2020.01)

(52) U.S. Cl.
CPC .......... *H05B 47/19* (2020.01); *H04L 12/2803* (2013.01); *H05B 47/195* (2020.01)

(56) References Cited

U.S. PATENT DOCUMENTS

| | | |
|---|---|---|
| 5,982,103 A | 11/1999 | Mosebrook et al. |
| 6,167,464 A | 12/2000 | Kretschmann |
| 6,327,535 B1 | 12/2001 | Evans et al. |
| 6,803,728 B2 | 10/2004 | Balasubramaniam et al. |
| 7,038,584 B2 | 5/2006 | Carter |
| 7,339,523 B2 | 3/2008 | Bye |
| 7,358,854 B2 | 4/2008 | Egner et al. |
| 7,391,297 B2 | 6/2008 | Cash et al. |
| 7,755,505 B2 | 7/2010 | Johnson et al. |
| 7,764,162 B2 | 7/2010 | Cash et al. |
| 7,880,639 B2 | 2/2011 | Courtney et al. |
| 7,889,051 B1 | 2/2011 | Billig et al. |
| 7,925,384 B2 | 4/2011 | Huizenga et al. |
| 8,009,042 B2 | 8/2011 | Steiner et al. |
| RE42,927 E | 11/2011 | Want et al. |
| 8,099,195 B2 | 1/2012 | Imes et al. |
| 8,108,076 B2 | 1/2012 | Imes et al. |
| 8,159,156 B2 | 4/2012 | Henig et al. |
| 8,174,381 B2 | 5/2012 | Imes et al. |
| 8,199,010 B2 | 6/2012 | Sloan et al. |
| 8,228,184 B2 | 7/2012 | Blakeley et al. |
| 8,326,793 B1 | 12/2012 | Bowers et al. |
| 8,334,898 B1 | 12/2012 | Ryan et al. |
| 8,334,901 B1 | 12/2012 | Ganick et al. |
| 8,351,937 B2 | 1/2013 | Lee |
| 8,373,362 B2 | 2/2013 | Chemel et al. |
| 8,396,604 B2 | 3/2013 | Imes et al. |
| 8,410,706 B2 | 4/2013 | Steiner et al. |
| 8,412,382 B2 | 4/2013 | Imes et al. |
| 8,416,290 B2 | 4/2013 | Ryan et al. |
| 8,417,388 B2 | 4/2013 | Altonen et al. |
| 8,422,401 B1 | 4/2013 | Choong et al. |
| 8,428,782 B2 | 4/2013 | Imes |
| 8,432,438 B2 | 4/2013 | Ryan et al. |
| 8,436,896 B2 | 5/2013 | Staats et al. |
| 8,451,116 B2 | 5/2013 | Steiner et al. |
| 8,457,502 B2 | 6/2013 | Ryan et al. |
| 8,457,793 B2 | 6/2013 | Golding et al. |
| 8,457,797 B2 | 6/2013 | Imes et al. |
| 8,473,109 B1 | 6/2013 | Imes et al. |
| 8,498,749 B2 | 7/2013 | Imes et al. |
| 8,504,174 B2 | 8/2013 | Rahme et al. |
| 8,504,180 B2 | 8/2013 | Imes et al. |
| 8,509,954 B2 | 8/2013 | Imes et al. |
| 8,510,255 B2 | 8/2013 | Fadell et al. |
| 8,570,221 B2 | 10/2013 | Bao et al. |
| 8,571,518 B2 | 10/2013 | Imes et al. |
| 8,577,392 B1 | 11/2013 | Pai et al. |
| 8,600,564 B2 | 12/2013 | Imes et al. |
| 8,610,376 B2 | 12/2013 | Chemel et al. |
| 8,610,377 B2 | 12/2013 | Chemel et al. |
| 8,626,344 B2 | 1/2014 | Imes et al. |
| 8,630,741 B1 | 1/2014 | Matsuoka et al. |
| 8,659,230 B2 | 2/2014 | Nanahara et al. |
| 8,710,772 B2 | 4/2014 | Henig et al. |
| 8,725,178 B2 | 5/2014 | Mohideen et al. |
| 8,729,835 B2 | 5/2014 | Henig et al. |
| 8,749,146 B2 | 6/2014 | Jones |
| 8,755,039 B2 | 6/2014 | Ramer et al. |
| 8,760,262 B2 | 6/2014 | Veskovic |
| 8,779,905 B2 | 7/2014 | Courtney et al. |
| 8,788,448 B2 | 7/2014 | Fadell et al. |
| 8,796,958 B2 | 8/2014 | Billig et al. |
| 8,812,419 B1 | 8/2014 | Teller et al. |
| 8,823,277 B2 | 9/2014 | Chemel et al. |
| 8,829,821 B2 | 9/2014 | Chobot et al. |
| 8,832,003 B1 | 9/2014 | Bowers et al. |
| 8,855,830 B2 | 10/2014 | Imes et al. |
| 8,909,380 B2 | 12/2014 | Golding et al. |
| 8,912,735 B2 | 12/2014 | Chobot et al. |
| 8,912,905 B2 | 12/2014 | Wong et al. |
| 8,928,232 B2 | 1/2015 | Aggarwal et al. |
| 8,954,170 B2 | 2/2015 | Chemel et al. |
| 8,994,295 B2 | 3/2015 | Mohan et al. |
| 9,001,317 B2 | 4/2015 | Ramer et al. |
| 9,035,769 B2 | 5/2015 | Steiner et al. |
| 9,053,456 B2 | 6/2015 | Verthein et al. |
| 9,060,392 B2 | 6/2015 | Aggarwal et al. |
| 9,071,453 B2 | 6/2015 | Shoemaker et al. |
| 9,072,133 B2 | 6/2015 | Chemel et al. |
| 9,107,152 B1 | 8/2015 | Wurster |
| 9,148,937 B2 | 9/2015 | Steiner et al. |
| 9,164,524 B2 | 10/2015 | Imes et al. |
| 9,204,291 B2 | 12/2015 | Jackson et al. |
| 9,232,610 B2 | 1/2016 | Gritti |
| 9,237,620 B1 | 1/2016 | Knapp et al. |
| 9,345,115 B2 | 5/2016 | Mohan |
| 9,374,874 B1 | 6/2016 | Ewing |
| 9,386,668 B2 | 7/2016 | Knapp et al. |
| 9,392,657 B2 | 7/2016 | Lee et al. |
| 9,437,086 B2 | 9/2016 | Loveland et al. |
| 9,441,979 B2 | 9/2016 | Barnard et al. |
| 9,480,131 B1 | 10/2016 | Thorn |
| 9,520,250 B2 | 12/2016 | O'Keeffe |
| 9,521,722 B2 | 12/2016 | Wong et al. |
| 9,578,724 B1 | 2/2017 | Knapp et al. |
| 9,651,632 B1 | 2/2017 | Knapp et al. |
| 9,602,172 B2 | 3/2017 | Jackson et al. |
| 9,746,333 B2 | 8/2017 | Barnard et al. |
| 9,807,857 B2 | 10/2017 | Huang |
| 9,848,481 B2 | 12/2017 | Ando |
| 10,088,818 B1 | 10/2018 | Matthews et al. |
| 10,135,629 B2 | 11/2018 | Browne, Jr. et al. |
| 10,599,174 B2 * | 3/2020 | Baker ............... H04W 4/33 |
| 11,204,616 B2 * | 12/2021 | Baker ............... H04B 17/318 |
| 11,726,516 B2 * | 8/2023 | Baker ............... G05F 1/66 700/286 |
| 2001/0041982 A1 | 11/2001 | Kawasaki et al. |
| 2003/0013459 A1 | 1/2003 | Rankin et al. |
| 2007/0140530 A1 | 6/2007 | Coogan et al. |
| 2007/0194987 A1 | 8/2007 | Fedora |
| 2008/0092075 A1 | 4/2008 | Jacob et al. |
| 2008/0157957 A1 | 7/2008 | Pitchers et al. |
| 2008/0183307 A1 | 7/2008 | Clayton et al. |
| 2008/0197782 A1 | 8/2008 | Frumau |
| 2008/0315772 A1 | 12/2008 | Knibbe |
| 2009/0206983 A1 | 8/2009 | Knode et al. |
| 2009/0300174 A1 | 12/2009 | Floris et al. |
| 2010/0181938 A1 | 7/2010 | Boleko Ribas et al. |
| 2010/0188009 A1 | 7/2010 | Bull |
| 2010/0201267 A1 | 8/2010 | Bourquin et al. |

(56) References Cited

U.S. PATENT DOCUMENTS

| | | |
|---|---|---|
| 2010/0245588 A1 | 9/2010 | Waehner et al. |
| 2010/0289643 A1 | 11/2010 | Trundle et al. |
| 2011/0029370 A1 | 2/2011 | Roeding et al. |
| 2011/0211110 A1 | 9/2011 | Doublet |
| 2011/0213588 A1 | 9/2011 | Lin et al. |
| 2011/0316451 A1 | 12/2011 | Loveland et al. |
| 2012/0001567 A1 | 1/2012 | Knapp et al. |
| 2012/0092204 A1 | 4/2012 | Talstra et al. |
| 2012/0163206 A1 | 6/2012 | Leung et al. |
| 2012/0169249 A1 | 7/2012 | Loveland et al. |
| 2012/0242231 A1 | 9/2012 | Manni et al. |
| 2012/0319597 A1 | 12/2012 | Park et al. |
| 2013/0006425 A1 | 1/2013 | Bell et al. |
| 2013/0010018 A1 | 1/2013 | Economy |
| 2013/0026947 A1 | 1/2013 | Economy et al. |
| 2013/0030589 A1 | 1/2013 | Pessina et al. |
| 2013/0058660 A1 | 3/2013 | Bae et al. |
| 2013/0085609 A1 | 4/2013 | Barker |
| 2013/0109404 A1 | 5/2013 | Husney |
| 2013/0109406 A1 | 5/2013 | Meador et al. |
| 2013/0141223 A1 | 6/2013 | Brandsma et al. |
| 2013/0145610 A1 | 6/2013 | Feri et al. |
| 2013/0170378 A1 | 7/2013 | Ray et al. |
| 2013/0181834 A1 | 7/2013 | Bentley et al. |
| 2013/0214609 A1 | 8/2013 | Carmen, Jr. et al. |
| 2013/0222122 A1 | 8/2013 | Killo et al. |
| 2013/0245837 A1 | 9/2013 | Grohman |
| 2013/0285472 A1 | 10/2013 | Bull |
| 2013/0303193 A1 | 11/2013 | Dharwada et al. |
| 2013/0314560 A1 | 11/2013 | Gritti et al. |
| 2013/0331087 A1 | 12/2013 | Shoemaker et al. |
| 2014/0001846 A1 | 1/2014 | Mosebrook et al. |
| 2014/0001977 A1 | 1/2014 | Zacharchuk et al. |
| 2014/0009068 A1 | 1/2014 | Ivey et al. |
| 2014/0031987 A1 | 1/2014 | Ericsson et al. |
| 2014/0042915 A1 | 2/2014 | Ono et al. |
| 2014/0045549 A1 | 2/2014 | Ryan et al. |
| 2014/0052783 A1 | 2/2014 | Swatsky et al. |
| 2014/0062309 A1 | 3/2014 | Kim |
| 2014/0066098 A1 | 3/2014 | Stern et al. |
| 2014/0070919 A1 | 3/2014 | Jackson et al. |
| 2014/0086590 A1 | 3/2014 | Ganick et al. |
| 2014/0103819 A1 | 4/2014 | Mohan |
| 2014/0106735 A1 | 4/2014 | Jackson et al. |
| 2014/0108084 A1 | 4/2014 | Bargetzi et al. |
| 2014/0122017 A1 | 5/2014 | Chu |
| 2014/0129006 A1 | 5/2014 | Chen et al. |
| 2014/0132475 A1 | 5/2014 | Bhutani et al. |
| 2014/0153923 A1 | 6/2014 | Casaccia |
| 2014/0159589 A1 | 6/2014 | Pandharipande et al. |
| 2014/0175875 A1 | 6/2014 | Newman, Jr. et al. |
| 2014/0175990 A1 | 6/2014 | Bhatkar et al. |
| 2014/0176310 A1 | 6/2014 | Kotlicki |
| 2014/0177469 A1 | 6/2014 | Neyhart |
| 2014/0180487 A1 | 6/2014 | Bull |
| 2014/0191848 A1 | 7/2014 | Imes et al. |
| 2014/0222213 A1 | 8/2014 | Mohan et al. |
| 2014/0232298 A1 | 8/2014 | Gillies et al. |
| 2014/0235265 A1 | 8/2014 | Slupik |
| 2014/0235269 A1 | 8/2014 | Ericsson et al. |
| 2014/0239816 A1 | 8/2014 | Lee |
| 2014/0239852 A1 | 8/2014 | Kim et al. |
| 2014/0246991 A1 | 9/2014 | Kim |
| 2014/0247117 A1 | 9/2014 | Veskovic |
| 2014/0250200 A1 | 9/2014 | Geurts et al. |
| 2014/0265568 A1 | 9/2014 | Crafts et al. |
| 2014/0265870 A1 | 9/2014 | Walma et al. |
| 2014/0267008 A1 | 9/2014 | Jain et al. |
| 2014/0269222 A1 | 9/2014 | Patton et al. |
| 2014/0274114 A1 | 9/2014 | Rowitch |
| 2014/0277763 A1 | 9/2014 | Ramachandran et al. |
| 2014/0277805 A1 | 9/2014 | Browne, Jr. et al. |
| 2014/0285090 A1 | 9/2014 | Chemel et al. |
| 2014/0285113 A1 | 9/2014 | Huang |
| 2014/0293605 A1 | 10/2014 | Chemel et al. |
| 2014/0312777 A1 | 10/2014 | Shearer et al. |
| 2014/0333206 A1 | 11/2014 | Simons et al. |
| 2014/0337080 A1 | 11/2014 | Jackson |
| 2015/0008828 A1 | 1/2015 | Carrigan et al. |
| 2015/0008845 A1 | 1/2015 | Kim et al. |
| 2015/0015377 A1 | 1/2015 | Bull et al. |
| 2015/0038165 A1 | 2/2015 | Tuo et al. |
| 2015/0038171 A1 | 2/2015 | Uilecan et al. |
| 2015/0046385 A1 | 2/2015 | Shimizu et al. |
| 2015/0048758 A1 | 2/2015 | Carrigan et al. |
| 2015/0048924 A1 | 2/2015 | Feldstein et al. |
| 2015/0054620 A1 | 2/2015 | Graube et al. |
| 2015/0061511 A1 | 3/2015 | Chemel et al. |
| 2015/0076993 A1 | 3/2015 | Mohan |
| 2015/0081474 A1 | 3/2015 | Kostka et al. |
| 2015/0137699 A1 | 5/2015 | Killo et al. |
| 2015/0147067 A1 | 5/2015 | Ryan et al. |
| 2015/0148964 A1 | 5/2015 | Schultz et al. |
| 2015/0179058 A1 | 6/2015 | Crafts et al. |
| 2015/0185752 A1 | 7/2015 | Bard et al. |
| 2015/0189068 A1 | 7/2015 | Mohan et al. |
| 2015/0189723 A1 | 7/2015 | Ogawa |
| 2015/0189724 A1 | 7/2015 | Karc et al. |
| 2015/0195099 A1 | 7/2015 | Imes et al. |
| 2015/0204561 A1 | 7/2015 | Sadwick et al. |
| 2015/0223309 A1 | 8/2015 | Mohan et al. |
| 2015/0223310 A1 | 8/2015 | Steiner et al. |
| 2015/0230323 A1 | 8/2015 | Steiner et al. |
| 2015/0241860 A1 | 8/2015 | Raid |
| 2015/0279051 A1 | 10/2015 | Kovesi et al. |
| 2015/0296594 A1 | 10/2015 | Blum et al. |
| 2015/0301543 A1 | 10/2015 | Janos et al. |
| 2015/0339096 A1 | 11/2015 | Lakshminarayanan |
| 2015/0342010 A1 | 11/2015 | Romano |
| 2015/0365787 A1 | 12/2015 | Farrell |
| 2015/0366035 A1 | 12/2015 | Baek et al. |
| 2015/0373482 A1 | 12/2015 | Barnard et al. |
| 2016/0056629 A1 | 2/2016 | Baker et al. |
| 2016/0077532 A1 | 3/2016 | Lagerstedt et al. |
| 2016/0128158 A1 | 5/2016 | Harder |
| 2016/0150624 A1* | 5/2016 | Meerbeek ............ H05B 47/10 315/297 |
| 2016/0205748 A1 | 7/2016 | Lashina |
| 2016/0286631 A1 | 9/2016 | Wan et al. |
| 2016/0338170 A1 | 11/2016 | Lebel et al. |
| 2016/0345414 A1 | 11/2016 | Nolan et al. |
| 2017/0038787 A1 | 2/2017 | Baker et al. |
| 2017/0099720 A1 | 4/2017 | Ogawa |
| 2018/0027386 A1 | 1/2018 | Zampini, II |
| 2018/0177031 A1 | 6/2018 | Yoo et al. |
| 2018/0198526 A1 | 7/2018 | Mueller et al. |
| 2018/0219869 A1 | 8/2018 | Kumar |
| 2018/0242434 A1 | 8/2018 | Wang et al. |

FOREIGN PATENT DOCUMENTS

| | | |
|---|---|---|
| CN | 103874290 A | 6/2014 |
| CN | 104035403 A | 9/2014 |
| CN | 104320883 A | 1/2015 |
| CN | 104320883 A1 | 1/2015 |
| CN | 104812143 A1 | 7/2015 |
| DE | 102009052952 A1 | 9/2010 |
| EP | 2410822 A2 | 1/2012 |
| EP | 3195699 A2 | 7/2017 |
| EP | 3332612 A2 | 6/2018 |
| EP | 3376835 A1 | 9/2018 |
| EP | 3376836 A1 | 9/2018 |
| WO | WO2004/049767 A1 | 6/2004 |
| WO | WO2004/057368 A1 | 7/2004 |
| WO | WO2013/001432 A1 | 1/2013 |
| WO | WO2013/111134 A1 | 8/2013 |
| WO | WO2013/132393 A1 | 9/2013 |
| WO | WO2014/009291 A1 | 1/2014 |
| WO | WO2014/057460 A1 | 4/2014 |
| WO | WO2014/203170 A1 | 12/2014 |
| WO | WO2015/001444 A1 | 1/2015 |
| WO | WO2015/025235 A1 | 2/2015 |

(56) References Cited

FOREIGN PATENT DOCUMENTS

| WO | WO2016/029165 A2 | 2/2016 |
| WO | WO 2017024275 A2 | 2/2017 |

OTHER PUBLICATIONS

Estel, et al., Feasibility of Bluetooth iBeacons for Indoor Localization, Digital Enterprise Computing, Lecture Notes in Informatics (LNI), 2015, 11 pages.

* cited by examiner

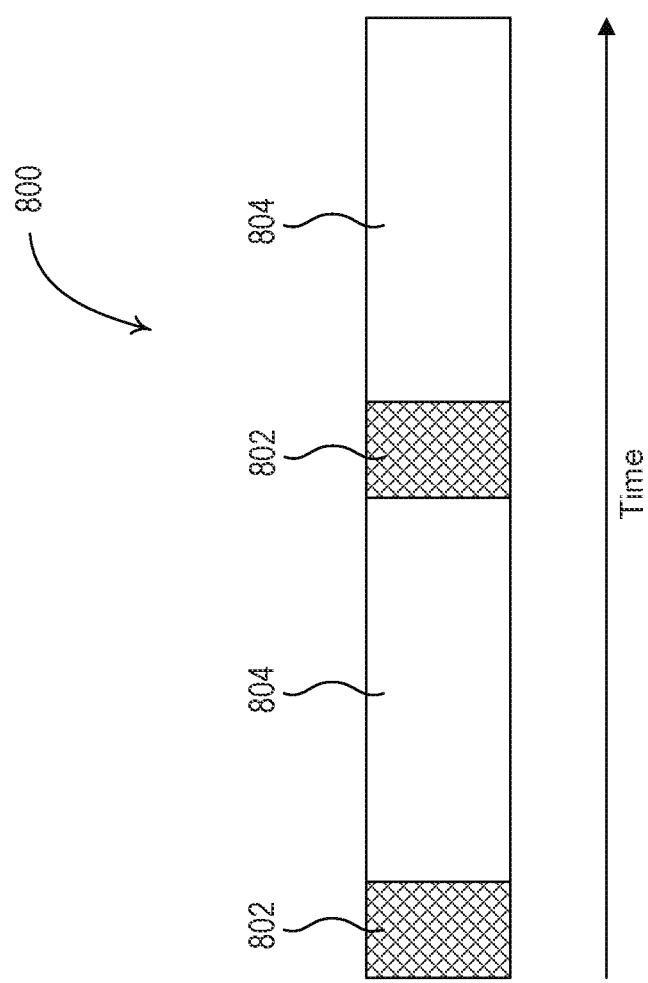

LOAD CONTROL SYSTEM RESPONSIVE TO THE LOCATION OF AN OCCUPANT AND/OR MOBILE DEVICE

CROSS-REFERENCE TO RELATED APPLICATIONS

This application is a continuation of U.S. patent application Ser. No. 17/552,545, filed Dec. 16, 2021; which is a continuation of U.S. patent application Ser. No. 16/783,572, filed Feb. 6, 2020, now U.S. Pat. No. 11,204,616, issued Dec. 21, 2021; which is a continuation of U.S. patent application Ser. No. 15/230,263, filed Aug. 5, 2016, now U.S. Pat. No. 10,599,174, issued on Mar. 24, 2020; all of which claim the benefit of U.S. Provisional Patent Application No. 62/201,522, filed Aug. 5, 2015, the entire disclosures of which are incorporated by reference herein.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and air conditioning (HVAC) system may be used to control the temperature in the user environment.

Each load control system may include various control devices, including control-source devices and control-target devices. The control-target devices may receive digital messages, which may include load control instructions, for controlling an electrical load from one or more of the control-source devices. The control-target devices may be capable of controlling an electrical load. The control-source devices may be capable of controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of control-source devices may include remote control devices, occupancy sensors, daylight sensors, temperature sensors, and/or the like.

Although control-source devices may be capable of controlling a control-target device, a control-source device may not be capable of controlling a control-target device, based on a user location and/or a mobile device. For example, a control-source device may not be capable of setting a control-target device to a lighting intensity, based on a user and/or mobile device located within the load control system. This may be desirable, for example, for users located in an office that may desire to have a lighting intensity, temperature level, and/or natural light provided at a predefined level.

SUMMARY

The present disclosure relates to a load control system for controlling the amount of power delivered to one or more electrical load, and more particularly, to a load control system able to control one or more electrical loads in response to the location of a control device and/or an occupant.

As described herein, a load control system for controlling an electrical load in a space of a building occupied by an occupant may include a controller that may determine the location of the occupant, and a load control device that may automatically control the electrical load in response to the location of the occupant. The load control system may include a mobile device that may be located on or adjacent the occupant and that may transmit and receive wireless signals. The load control device may automatically control the electrical load when the mobile device is located in the space. The load control device may include a lighting control device for controlling the intensity of a lighting load, for example, to a preset intensity that is dependent upon a unique identifier of the mobile device. The load control device and/or the controller may learn the preset intensity for the mobile device. The load control system may further include an occupancy sensor and the load control device may automatically control the electrical load when the occupancy sensor indicates that the space is occupied and the mobile device is located in the space.

A load control system for controlling an electrical load may include a load control device that may control the electrical load, a mobile device that may transmit and receive wireless signals, and a system controller that may receive the wireless signals from the mobile device and to determine the location of the mobile device. The system controller may automatically transmit a command to the load control device for controlling the electrical load when the controller determines that the mobile device is in a space.

A load control system for controlling an electrical load may include a load control device that may control the electrical load, and a mobile device that may transmit a wireless signal including a command for controlling the electrical load. The mobile device may determine its location within the building and adjust its operation in response to the location.

A mobile device for use in a control system having one or more control devices located at fixed locations around a building is also described herein. The mobile device may include a wireless communication circuit for receiving wireless signals from the control devices, and a controller responsive to the wireless communication circuit. The controller may measure signal strengths of the wireless signals received from the control devices and store a set of measured signal strengths at a first location as a first signal strength signature. The controller may subsequently measure the signal strengths of the wireless signals received from the control devices and determine that the mobile device is at the first location by comparing the measured signal strengths with the first signal strength signature.

Other features and advantages of the present disclosure will become apparent from the following detailed description that refers to the accompanying drawings.

BRIEF DESCRIPTION OF THE DRAWINGS

FIGS. 8A, 8B, 8C are a block diagrams illustrating example timelines in which control devices may switch communication protocols.

DETAILED DESCRIPTION

Figure 1A:
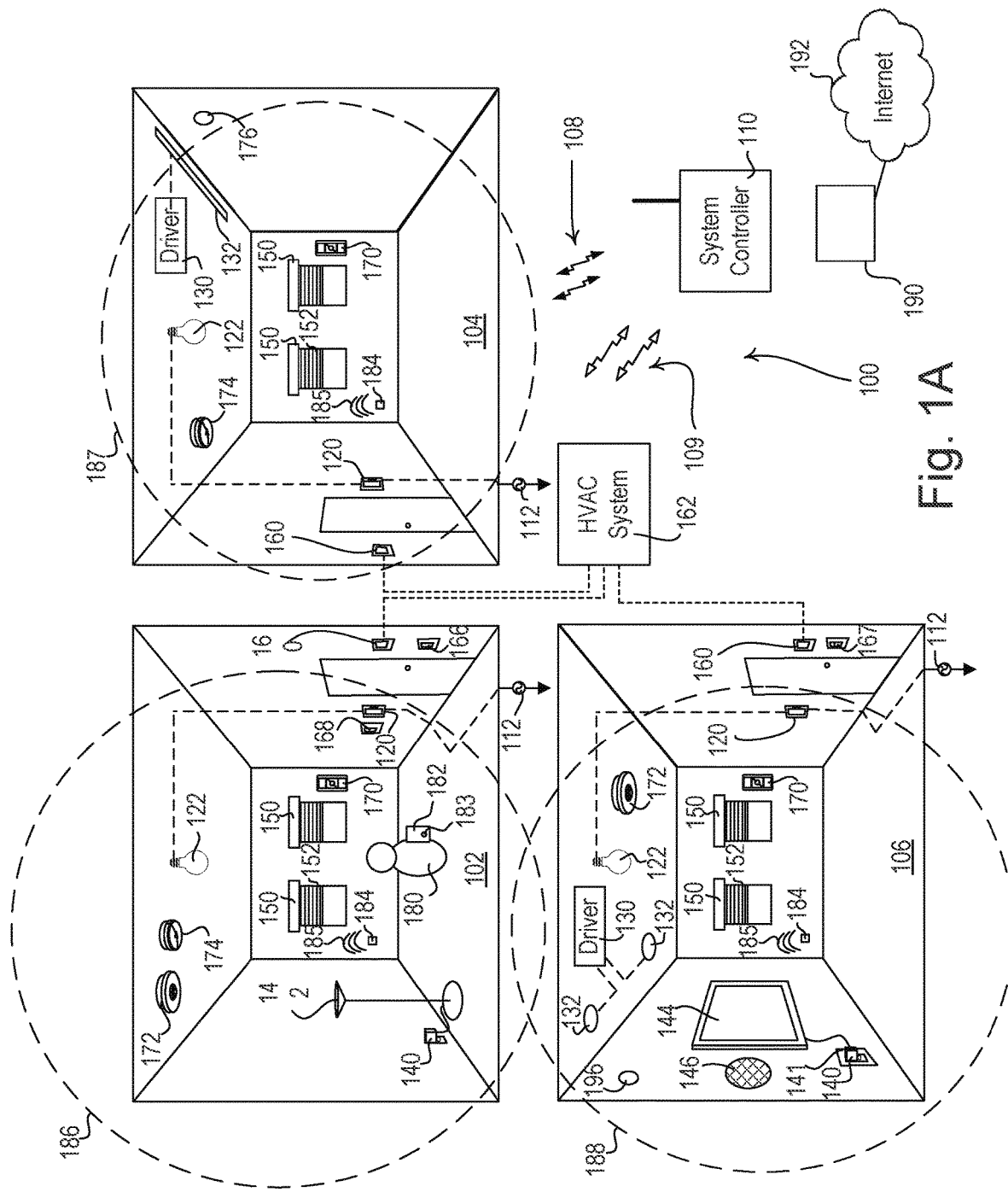
FIG. 1A is a diagram of an example load control system for controlling one or more electrical loads.

FIG. 1A is a diagram of an example load control system 100 for controlling the amount of power delivered from an alternating-current (AC) power source 112 to one or more electrical loads. The load control system 100 may be installed in a building having one or more rooms 102, 104, 106. The load control system 100 may include control devices that may communicate with each other via wireless signals, e.g., radio-frequency (RF) signals 108. Although a separate AC power source 112 is depicted for each of the rooms 12, 104, 106, one or more AC power sources 112 may be used for each of the rooms 102, 104, 106. The AC power sources 112 used for each of the rooms 102, 104, 106 may be the same, or different, AC power source 112. The AC power sources 112 may provide electrical power to dimmer switches 120 and/or the AC power sources 112 may be provide electrical power to one or more other control devices located within rooms 102, 104, 106.

The load control system 100 may include a wired digital communication link coupled to one or more of the control devices to provide for communication between the control devices. The control devices of the load control system 100 may include a number of control-source devices and/or control-target devices. The control-source devices may include input devices operable to transmit digital messages in response to user inputs, occupancy/vacancy conditions, changes in measured light intensity, etc. Control-target devices may include load control devices or other devices operable to receive digital messages from control-source devices. The control-target devices may control respective electrical loads in response to the received digital messages. A single control device of the load control system 100 may operate as both a control-source and a control-target device.

The control-source devices may transmit digital messages directly or indirectly to the control-target devices. The load control system 100 may include a system controller 110 (e.g., a central controller or load controller) operable to communicate digital messages to and from the control devices (e.g., the control-source devices and/or the control-target devices). For example, the system controller 110 may receive digital messages from the control-source devices and transmit digital messages to the control-target devices in response to the digital messages received from the control-source devices. The control-source devices, the control-target devices, and the system controller 110 may transmit and receive the RF signals 108 using a proprietary RF protocol, such as the ClearConnect® protocol. The RF signals 108 may be transmitted using a different RF protocol, such as, a standard protocol, for example, one of Wi-Fi®, ZIGBEE®, Z-WAVE®, KNX-RF, ENOCEAN RADIO protocols, or a different proprietary protocol.

The load control system 100 may include one or more load control devices, e.g., dimmer switches 120, for controlling respective lighting loads 122 located in each of the rooms 102, 104, 106. A dimmer switch 120 may be adapted to be wall-mounted in a standard electrical wallbox. The dimmer switch 120 may include a tabletop or plug-in load control device (such as lighting load 122, shown in FIG. 1A). The dimmer switch 120 may include a toggle actuator (e.g., a button) and an intensity adjustment actuator (e.g., a rocker switch). Actuations (e.g., successive actuations) of the toggle actuator may toggle, e.g., turn off and on, the respective lighting load 122. Actuations of an upper portion or a lower portion of the intensity adjustment actuator may respectively increase or decrease the amount of power delivered to the respective lighting load 122 and thus increase or decrease the intensity of the receptive lighting load from a minimum intensity (e.g., approximately 1%) to a maximum intensity (e.g., approximately 100%). The dimmer switch 120 may include one or more visual indicators, e.g., light-emitting diodes (LEDs), which may be arranged in a linear array and may be illuminated to provide feedback of the intensity of the respective lighting load 122. Examples of wall-mounted dimmer switches are described in greater detail in U.S. Pat. No. 5,248,919, issued Sep. 28, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may wirelessly receive digital messages via the RF signals 108 (e.g., from the system controller 110) and to control the respective lighting load 122 in response to the received digital messages. Examples of dimmer switches operable to transmit and receive digital messages is described in greater detail in commonly-assigned U.S. Patent Application Publication No. 2009/0206983, published Aug. 20, 2009, entitled COMMUNICATION SYSTEM FOR A RADIO-FREQUENCY LOAD CONTROL SYSTEM, the entire disclosure of which is hereby incorporated by reference.

The load control system 100 may include one or more remotely-located load control devices, such as light-emitting diode (LED) drivers 130 for driving respective LED light sources 132 (e.g., LED light engines). The LED drivers 130 may be located remotely, for example, in or adjacent to the lighting fixtures of the respective LED light sources 132. The LED drivers 130 may receive digital messages via the RF signals 108 (e.g., from the system controller 110) and to control the respective LED light sources 132 in response to the received digital messages. The LED drivers 130 may adjust the color temperature of the respective LED light sources 132 in response to the received digital messages. Examples of LED drivers that control the color temperature of LED light sources are described in greater detail in commonly-assigned U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference. The load control system 100 may further include other types of remotely-located load control devices, such as, for example, electronic dimming ballasts for driving fluorescent lamps.

The load control system 100 may include one or more plug-in load control devices 140, for controlling respective plug-in electrical loads. For example, a plug-in lighting load, such as a floor lamp 142 or a table lamp, may be plugged into one of the plug-in load control devices 140, such that the plug-in load control device is coupled in series between the AC power source and the plug-in lighting load. The plug-in load control device 140 may receive digital messages via the RF signals 108 (e.g., from the system controller 110) and to turn on and off or adjust the intensity of the plug-in lighting load in response to the received digital messages. An appliance, such as a television 144, may be plugged into one of the plug-in load control devices 140, and the plug-in load control device may be turn the appliance on and off in response to the digital messages received via the RF signals 108.

Alternatively, or additionally, the load control system 100 may include controllable receptacles 141 for controlling plug-in electrical loads plugged into the receptacles 141. The load control system 100 may include one or more load control devices or appliances that may receive the wireless signals 108 from the system controller 110, such as a speaker 146 (e.g., part of an audio/visual or intercom system), which is able to generate audible sounds, such as alarms, music, intercom functionality, etc.

The load control system 100 may include one or more daylight control devices, e.g., motorized window treatments 150, such as motorized cellular shades, for controlling the amount of daylight entering the building in which the load control system 100 is installed. The motorized window treatments 150 may receive digital messages via the RF signals 108 (e.g., from the system controller 110) and may adjust the position of covering material 152, such as a window treatment fabric, in response to the received digital messages. The load control system 100 may include other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control devices.

The load control system 100 may include one or more temperature control devices 160 (e.g., thermostats) for controlling a room temperature in each of the rooms 102, 104, 106. A temperature control device 160 may be coupled to a heating, ventilation, and air conditioning (HVAC) system 162 via a control link (e.g., an analog control link or a wired digital communication link). The temperature control device 160 may wirelessly communicate digital messages with a controller of the HVAC system 162. The temperature control device 160 may include a temperature sensor for measuring the room temperature of the respective room 102, 104, 106 and may control the HVAC system 162 to adjust the temperature in the room to a respective setpoint temperature.

The load control system 100 may include one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable power strip for controlling one or more plug-in loads; a motor control unit for controlling a motor load, such as a ceiling fan or an exhaust fan; a drive unit for controlling a projection screen; motorized interior or exterior shutters; a thermostat for a heating and/or cooling system; an air conditioner; a compressor; an electric baseboard heater controller; a controllable damper; a variable air volume controller; a fresh air intake controller; a ventilation controller; hydraulic valves for use in radiators and radiant heating systems; a humidity control unit; a humidifier; a dehumidifier; a water heater; a boiler controller; a pool pump; a refrigerator; a freezer; a computer monitor; a video camera; an audio system or amplifier; an elevator; a power supply; a generator; an electric charger, such as an electric vehicle charger; an alternative energy controller; and/or other load control devices.

The load control system 100 may include one or more input devices, e.g., such as battery-powered remote control devices 170, occupancy sensors 172, and/or daylight sensors 174. The input devices may be fixed or movable input devices. The battery-powered remote control devices 170, the occupancy sensors 172, and/or the daylight sensors 174 may be wireless control devices (e.g., RF transmitters) that may transmit digital messages via the RF signals 108 to the system controller 110 (e.g., directly to the system controller). For example, the battery-powered remote control device 170 may transmit digital messages to the system controller 110 via the RF signals 108 in response to an actuation of one or more buttons of the battery-powered remote control device. The system controller 110 may transmit one or more digital messages to the load control devices (e.g., the dimmer switches 120, the LED drivers 130, the plug-in load control devices 140, the motorized window treatments 150, and/or the temperature control devices 160) in response to the digital messages received from the battery-powered remote control devices 170, the occupancy sensors 172, and/or the daylight sensors 174. The battery-powered remote control devices 170, the occupancy sensors 172, and/or the daylight sensors 174 may transmit digital messages directly to the dimmer switches 120, the LED drivers 130, the plug-in load control devices 140, the motorized window treatments 150, and the temperature control devices 160. The input devices may also include a door entrance sensor, a door movement sensor, and/or a keycard door opening device.

The occupancy sensors 172 may detect occupancy and/or vacancy conditions in the rooms 102, 106 in which the occupancy sensors are mounted. The occupancy sensors 172 may transmit digital messages to the system controller 110 via the RF signals 108 in response to detecting the occupancy or vacancy conditions. The system controller 110 may turn one or more of the lighting loads 122 and/or the LED light sources 132 on and off in response to receiving an occupied command and a vacant command, respectively. The occupancy sensors 172 may operate as vacancy sensors, such that the lighting loads are turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY- POWERED OCCUPANCY SENSOR, the entire disclosures of which are hereby incorporated by reference.

The daylight sensors 174 may measure a total light intensity in the room 102, 104 in which the daylight sensor is installed. The daylight sensors 174 may transmit digital messages, including the measured light intensity for example, to the system controller 110 via the RF signals 108 for controlling the intensities of one or more of the lighting loads 122 and the LED light sources 132 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 100 may include one or more wireless temperature sensors (e.g., incorporated in the temperature control devices 160 or separate from the temperature control devices 160) located in the rooms 102, 104, 106 for measuring the room temperatures. The HVAC system 162 may turn a compressor on and off for cooling the rooms 102, 104, 106 and to turn a heating source on and off for heating the rooms in response to the control signals received from the temperature control devices 160. The HVAC system 162 may turn a fan of the HVAC system on and off in response to the control signals 108 received from the temperature control devices 160. The temperature control devices 160 and/or the HVAC system 162 may control one or more controllable dampers to control the air flow in each of the rooms 102, 104, 106.

The load control system 100 may include other types of input devices, such as temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, controllers (e.g., such as residential, commercial, or industrial controllers), and/or any combination thereof.

The system controller 110 may be coupled to a network, such as a wireless or wired local area network (LAN), e.g., for access to the Internet 192. The system controller 110 may be coupled to the Internet 192 either directly or via a router 190. The system controller 110 may be wirelessly connected to the network, e.g., using Wi-Fi® technology. The system controller 110 may be coupled to the network via a network communication bus (e.g., an Ethernet communication link).

The system controller 110 may communicate via the network with one or more mobile devices 182, such as, a personal computing device and/or a wearable wireless device. The mobile device 182 may be located on an occupant 180. For example, the mobile device 182 may be attached to the occupant's body or clothing, or the mobile device 182 may be held by the occupant. The mobile device 182 may be characterized by a unique identifier (e.g., a serial number or address stored in memory) that uniquely identifies the mobile device 182 and/or the occupant 180. Examples of personal computing devices may include a smart phone (for example, an iPhone® smart phone, an Android® smart phone, or a Blackberry® smart phone), a laptop, and/or a tablet device (for example, an iPad® handheld computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear).

The mobile device 182 may transmit digital messages to the system controller 110, for example, in one or more Internet Protocol packets. For example, the mobile device 182 may transmit digital messages to the system controller 110 over the LAN and/or via the Internet 192. The mobile device 182 may transmit digital messages over the Internet 192 to an external service (e.g., If This Then That (IFTTT®) service), and the digital messages may be received by the system controller 110. The mobile device 182 may transmit the RF signals 109 via a Wi-Fi® communication link, a Wi-MAX® communications link, a Bluetooth® communications link, a near field communication (NFC) link, a cellular communications link, a television white space (TVWS) communication link, or any combination thereof. Alternatively or additionally, the mobile device 182 may transmit RF signals 108 according to the proprietary protocol.

The load control system 100 may include other types of network devices coupled to the network, such as a desktop personal computer, a Wi-Fi® or wireless-communication-capable television, or any other suitable Internet-Protocol-enabled device. Examples of load control systems operable to communicate with mobile and/or other network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using the mobile device 182 and/or other network device during a configuration (or commissioning) procedure. The mobile device 182 may execute a graphical user interface (GUI) configuration software for allowing a user to program the operation of load control system 100. For example, the configuration software may run as an application or a web interface. The configuration software and/or the system controller 110 (e.g., via instructions from the configuration software) may generate a load control dataset (e.g., database) that defines the operation of the load control system 100. For example, the load control dataset (e.g., database) may include information regarding the operational settings of different load control devices of the load control system 100 (e.g., the dimmer switch 120, the LED drivers 130, the plug-in load control devices 140, the motorized window treatments 150, and/or the temperature control devices 160).

The load control dataset (e.g., database) may include information regarding associations between the load control devices and/or the input devices (e.g., the battery-powered remote control devices 170, the occupancy sensors 172, and/or the daylight sensors 174). For example, information relating to the load control device and/or the input device associations may be stored at the system controller 110. For example, identifiers of the load control devices and/or the input devices that are associated may be stored at the system controller 110. The load control database may include information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

When the mobile device 182 is a wearable wireless device, the mobile device 182 may include one or more sensing devices for sensing one or more parameters (e.g., biometric data) that define the physical condition (e.g., behavior, movement, comfort, and/or health) of the occupant 180. For example, the sensing devices of the mobile device 182 may include an accelerometer for monitoring the movement of the occupant. In addition, the mobile device 182 may include sensing devices for monitoring the heart rate, the blood pressure, the body temperature, the blood sugar, and/or the perspiration level of the occupant 180. The mobile device 182 may transmit digital messages to the system controller 110 including data regarding the parameters measured by the sensing devices of the mobile device.

The system controller 110 may determine the state of and/or physical condition of the occupant 180 using the parameters measured by the sensing devices of the mobile device 182. For example, the system controller 110 may determine that the occupant 180 is sleeping or that the stress level of the occupant 180 is increasing in response to one or more of the parameters measured by the sensing devices of the mobile device 182.

The system controller 110 may determine the location of the mobile device 182 and/or the occupant 180. The system controller 110 may control (e.g., automatically control) the load control devices (e.g., the dimmer switches 120, the LED drivers 130, the plug-in load control devices 140, the motorized window treatments 150, and/or the temperature control devices 160) in response to determining the location of the mobile device 182 and/or the occupant 180. The system controller 110 may control the load control devices according to occupant control parameters associated with the occupant 180. The occupant control parameters may be predetermined or preset settings for the occupant 180. For example, occupant control parameters may include biometric data of the occupant, and/or user input data received from the occupant 180 via the mobile device 182.

One or more of the control devices of the load control system 100 may transmit beacon signals 185. For example, the beacon signals 185 may be RF beacon signals that may be transmitted using a short-range and/or low-power RF technology, such as Bluetooth® technology. The beacon signals 185 may be transmitted via the same protocol, or a different protocol, as the RF communication signals 108, 109. The load control system 100 may include one or more beacon transmitting devices 184 for transmitting the beacon signals 185 (e.g., dedicated beacon transmitting devices). The beacon transmitting device 184 may be a control device, or beacon transmitting device may be a device other than a control device. The beacon transmitting devices 184 may be battery-powered (e.g., including a battery for powering the beacon transmitting device). The beacon transmitting device 182 may be plugged into a receptacle (such as controllable receptacle 141) to receive AC power and/or may be connected to an external power supply for receiving DC power. Any fixed-location control device of the load control system 100 (e.g., any of the load control devices, such as the dimmer switches 120, the LED drivers 130, the motorized window treatments 150, and/or the temperature control devices 160) may transmit the beacon signals 185 (e.g., to operate beacon transmitting devices).

The mobile device 182 may receive a beacon signal 185 when located near a control device and/or a beacon transmitting device 184 that is transmitting the beacon signal 185. A beacon signal 185 may include a unique identifier identifying the location of the control device and/or the beacon transmitting device 184 that transmitted the beacon signal 185. Since the beacon signal 185 may be transmitted using a short-range and/or low-power technology (e.g., Bluetooth®, such as Bluetooth® low energy (BLE), nearfield communication (NFC), etc.), the unique identifier may indicate the approximate location of the mobile device 182. The mobile device 182 may transmit the unique identifier to the system controller 110, which may determine the location of the mobile device 182 using the unique identifier (e.g., using data stored in memory or retrieved via the Internet 192). The system controller 110 may transmit a location-based control element to the mobile device 182. The location-based control element may include a location (e.g., the determined location) and/or the names of an area, group, zone, load, electrical load, lighting load, control device, load control device, input device, preset, and/or scene associated with the location. The system controller 110 may control (e.g., automatically control) the load control devices in response to the location of the mobile device 182.

The mobile device 182 may "snap" to (e.g., lock onto) a beacon signal of one of the control devices and/or beacon transmitting devices 184 transmitting the beacon signal 185. Snapping to a beacon signal may mean that the mobile device is linked to and/or paired to (e.g., virtually linked to and/or paired to) the control device and/or the beacon transmitting device 184 transmitting the beacon signal 185. The mobile device 182 may be snapped to the beacon signal by the mobile device 182 and/or the system controller 110 reserving the beacon identifier as being linked to the mobile device 182. The mobile device 182 may send a message to the system controller 110 identifying the beacon signal and the system controller 110 may reserve the beacon signal for the mobile device 182 to be snapped to the beacon. The mobile device 182 may receive beacon signals 185 from one or more control devices and/or beacon transmitting devices 184. The mobile device 182 may snap to beacon signals 185 of one or more of the control devices and/or beacon transmitting devices 184. When a mobile device 182 snaps to a beacon signal 185 of a control device and/or beacon transmitting device 184, the mobile device 182 may be given control of the control device transmitting the beacon and/or the control devices associated with the beacon transmitted by the beacon transmitting devices 184. For example, the mobile device 182 may be able to adjust the intensity of light emitted by lighting loads controlled by control devices associated with the transmitting beacon signals to which the mobile device 182 is virtually linked, or light emitted by lighting loads controlled by the control device transmitting beacon signals to which the mobile device 182 is virtually linked. Other mobile devices may be prevented from snapping to a beacon signal 185 of a control device and/or a beacon transmitting device 184 after the mobile device 182 snaps to the beacon signal 185 of the control device and/or the beacon transmitting device 184. Other mobile devices may be permitted to snap to the beacon signal 185 of the control device and/or the beacon transmitting device 184 after the mobile device 182 snaps to the beacon signal 185 of the control device and/or the beacon transmitting device 184. For example, based on a status of a user (e.g., executive, administrator, etc.), a user may be permitted to snap to a beacon signal of a control device and/or the beacon transmitting device 184 even if the beacon signal of the control device and/or the beacon transmitting device 184 has been snapped to by another mobile device. When the mobile device 182 snaps to a beacon signal of a control device and/or a beacon transmitting device 184, an identifier of the device, and/or an identifier of the beacon signal 185 may be stored. For example, when the mobile device 182 snaps to a beacon signal of a control device, an identifier of the control device and/or an identifier of the beacon signal 185 may be stored by the system controller 110 and/or the mobile device 182.

The mobile device 182 and/or the system controller 110 may sort the received beacon signals 185 into a list. The mobile device 182 and/or the system controller 110 may order the list based on a ranging method. For example, the mobile device 182 and/or the system controller 110 may order the list based on the received signal strength indication (RSSI) of each beacon signal 185. The beacon signal having the highest RSSI may be listed first on the list. For example, the mobile device 182 may snap to the beacon signal having the highest RSSI of the received beacon signals 185. For example, the mobile device 182 and/or the system controller 110 may recognize an RSSI 186 at room 102, an RSSI 187 at room 104, and/or an RSSI of 188 at room 106. The mobile device 182 may allow for user selection of one of the beacons within the rooms. For example, the mobile device 182 may allow for user selection of one of the beacons within the rooms, based on the respective RSSI values. The mobile device 182 may allow for user selection of one of the beacons within the room and may allow the user to snap to the selected room.

The mobile device 182 may learn a particular beacon signal 185 as a commonly used (e.g., learned favorite) beacon signal. For example, if the user 180 is assigned room 102 as an office, the user 180 may commonly use room 102. The mobile device 182 may snap (e.g., may initially) snap to a beacon signal based on proximity of the mobile device 182 to the control device. The mobile device 182 may learn that beacon signal 185 within room 102 is commonly used by user 180. For example, the mobile device 182 may learn that mobile device 182 commonly snaps to beacon signal, based on proximity of the mobile device 182 to the control device. The beacon signal 185 within room 102 may be determined to be a learned favorite beacon signal for the user 180. The mobile device 182 may snap to the learned favorite beacon signal, notwithstanding other parameters. For example, the mobile device 182 may snap to the learned favorite beacon signal (e.g., beacon signal 185 in room 102) despite there being other beacon signals 185 having higher RSSIs than the favorite beacon. For example, if the user 180 positions himself closer to room 104 than room 102 (e.g., if the user walks by room 104), thereby having a higher RSSI value at 104 than at room 102, the mobile device 182 may continue to snap to room 102, because the beacon signal from room 102 is deemed a learned favorite of user 180.

The mobile device 182 may learn a particular beacon signal 185 is a learned favorite of a user 180 in one or more various ways. For example, the mobile device 182 may track the RSSIs of received beacon signals 185 over a period of time and may determine that the mobile device 182 is located near a particular beacon signal more often than other beacon signals (e.g., has repetitively snapped to that beacon signal for long periods of time, which may be greater than a predefined period of time). The mobile device 182 may learn (e.g., automatically learn) that beacon signal is the favorite beacon signal (e.g., by storing the unique identifier of the beacon signal in memory). The mobile device 182 may store the unique identifier of the beacon signal as a learned favorite when the mobile device identifies the beacon signal and/or snaps to the beacon a predefined number of times or for a predefined period of time within a defined time period.

The occupant 180 may manually set a favorite beacon signal to cause the mobile device 182 to learn a particular beacon signal as the favorite beacon signal. For example, the occupant 180 may select an option "Save current location as favorite location" on the visual display of the mobile device. The mobile device 182 may be provided advanced control options for the electrical loads associated with the favorite beacon signal when the mobile device is snapped to the favorite beacon signal. For example, the mobile device 182 may be capable of configuring settings (e.g. be provided with administrative privileges, such as setting time outs, occupancy controls, etc.) when the mobile device is snapped to the favorite beacon signal. The system controller 110 may control (e.g., automatically control) the mobile device 182 when the mobile device 182 snaps to the favorite beacon signal.

The mobile device 182 may snap to a beacon signal 185 if the RSSI of the received beacon signal is greater than a snap threshold. The snap thresholds may be a fixed level or a dynamic level. If the highest RSSI is spaced apart from the next highest RSSI by a predetermined amount, the snap threshold may be dynamically sized between the highest RSSI and the next highest RSSI, such that the mobile device 182 may snap to the beacon signal having the highest RSSI.

Figure 1B:
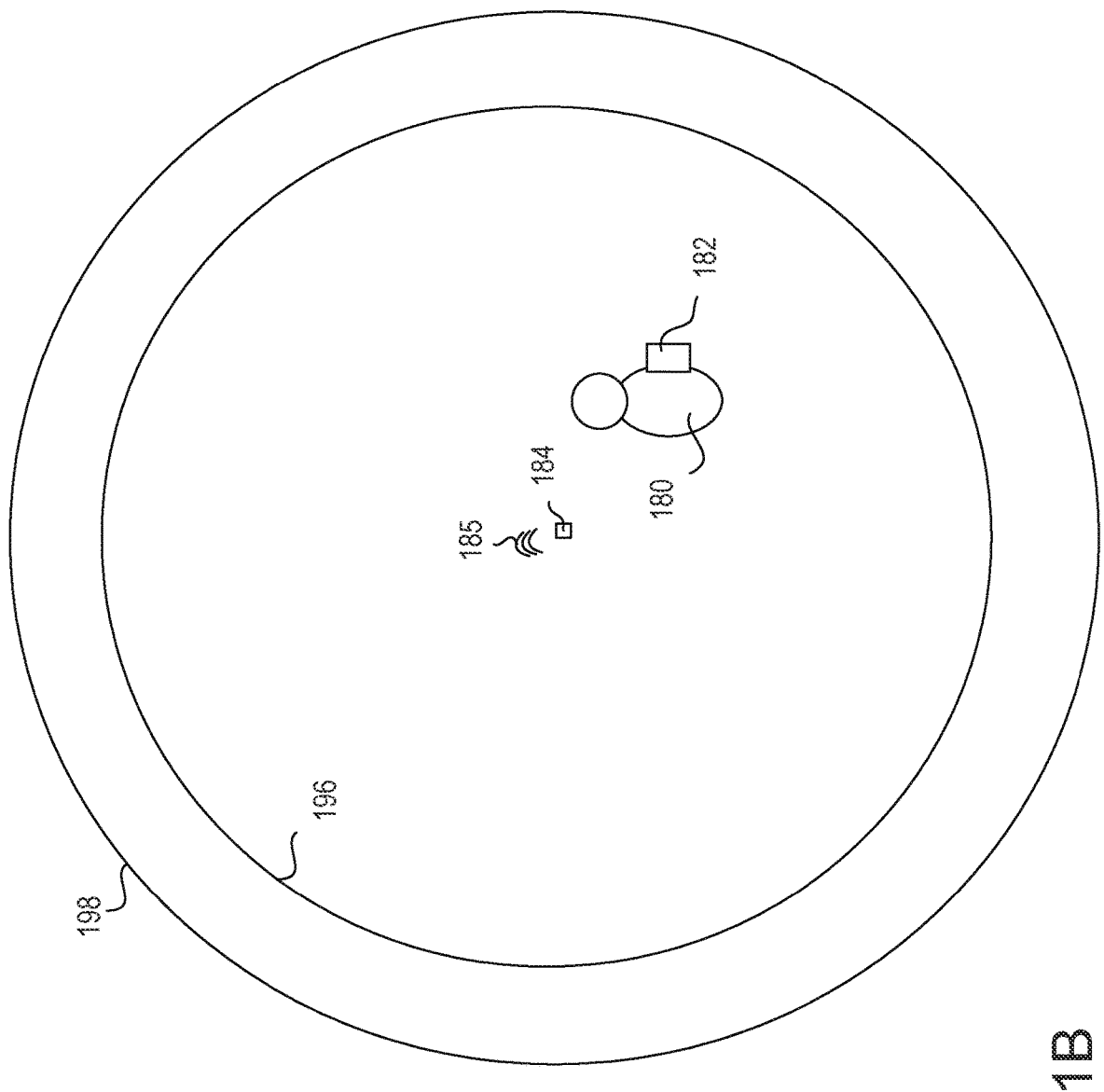
FIG. 1B is a diagram of example received signal strength indications (RSSIs) of beacons for controlling electrical loads in a load control system.

As shown in FIG. 1B, one or more snap thresholds 196, 198 may relate to a control device and/or a beacon transmitting device 184 transmitting a beacon signal. For example, if the beacon signal is greater than a snap threshold (e.g., snap threshold 196), the mobile device 182 may snap to the beacon signal. The mobile device 182 may unsnap (e.g., virtually unlink) from the beacon signal if the RSSI of that beacon signal drops below an unsnap threshold. Unsnapping from a beacon signal may cause the removal of the linking and/or pairing (e.g., a virtual linking and/or pairing) of the mobile device 185 and the control device transmitting the beacon signal 185. A stored identifier of the control device and/or beacon transmitting device 184 transmitting the beacon signal 185 in which the mobile device has snapped may be released when the mobile device 185 unsnaps from the beacon signal 185. For example, when the mobile device 182 unsnaps from the beacon signal 185 of a control device and/or a beacon transmitting device 184, the stored identifier of the device and/or the stored identifier of the beacon signal 185 may be released by the system controller 110 and/or the mobile device 182.

The unsnap threshold may be lower than the snap threshold (e.g., to provide hysteresis) and/or the snap threshold may be the same as the unsnap threshold. For example, the mobile device may remain snapped to the beacon signal as long as the beacon signal remains higher than snap threshold 198 (e.g., even if the beacon signal is below snap threshold 196). If there are multiple beacon signals having RSSIs above the snap threshold, the mobile device 182 may unsnap from the beacon having the lower RSSI and/or snap to the beacon signal having the higher RSSI. If there are multiple beacon signals having RSSIs above the snap threshold, the mobile device 182 may snap to a favorite beacon signal (e.g., if the unique identifier of the favorite beacon signal is stored in memory). The mobile device 182 may unsnap from the beacon signal in response to a manual input received at the mobile device.

After snapping to a beacon signal 185, the mobile device 182 may transmit the unique identifier of the beacon signal 185 to the system controller 110. The system controller 110 may determine the location of the mobile device 182 using the unique identifier. For example, the system controller 110 may have stored thereon a dataset of the beacon identifiers and the corresponding locations of the beacon identifiers, which may be used by the system controller as a look-up table to determine the location. The system controller 110 may transmit a location-based control element (e.g., the determined location and/or names of an area, groups, zones, electrical loads, control devices, load control devices, input devices, presets, and/or scenes associated with the location) to the mobile device 182. The system controller 110 may control (e.g., automatically control) the load control devices in response to the location of the mobile device 182.

After the mobile device 182 has snapped to a beacon signal 185, other mobile devices may be prevented from snapping to that beacon signal 185 (e.g., no other mobile devices may be allowed to snap to that beacon signal, or a predefined number of mobile devices may be allowed to snap to that beacon signal). For example, the mobile device 182 may have exclusive control of the electrical loads associated with that beacon signal. A mobile device 182 may be permitted to snap to a presently snapped signal, based on a status of the occupants. For example, an administrator, super user, executive, etc., may be permitted to snap to a beacon to which another user has already snapped. The mobile device 182 may unsnap from that beacon signal to allow another device to snap to the beacon signal. The visual display of the mobile device 182 may present adjacent locations to the occupant to allow the occupant to change to another area in case the mobile device snapped to an incorrect location. For example, the occupant may scroll (e.g., swipe) through adjacent areas until the name of the desired area is displayed.

In some cases, the mobile device may not snap to the beacon signal 185, and/or may receive the location-based control element for controlling the associated electrical loads from the system controller 110. The system controller 110 may log a unique identifier of the mobile device 182 when the mobile device 182 controls the electrical loads in a location. The identifiers of each mobile device that has performed control of an electrical load in a location may be logged by the system controller 110. The mobile device 182 may display the identity of the mobile devices that have controlled the electrical loads in the location. Accordingly, an occupant 180 of a location may track the identities of the users that controlled (e.g., recently controlled within a defined period of time) the electrical loads in the location.

The control devices that are transmitting beacon signals 185 may operate in one or more modes of operation. The modes of operation may be based on power (e.g., transmission power) and/or the modes of operation may be based on frequency (e.g., transmission frequency). For example, control devices may transmit beacon signals 185 in a normal mode of operation, in which the beacon signals 185 may be transmitted at a normal power level (e.g., 400 ms) and/or at a normal frequency (+6 dBm). The control devices may also, or alternatively, operate in another mode of operation in response to receiving a digital message. For example, a battery-powered beacon transmitting device may transmit beacon signals 185 in a mode of operation in which the beacon signals 185 may be transmitted in a low-power level (e.g., in which the beacon transmitting device may draw less current from the internal battery) and/or at a low frequency. The low power level and/or the low frequency may be lower than the normal power level and/or the normal frequency. The control devices may cease transmitting the beacon signals 185 in the low power mode of operation. The low power mode of operation may enable the control devices to consume less power. The control devices may transmit digital messages less frequently, and/or at a lower transmission power, in the low power mode of operation. Transmitting digital messages less frequently, and/or at a lower transmission power, may reduce RF traffic on the short-range RF communication link. The control devices may operate in one or more modes of operation in response to receiving a digital message.

A control device may enter a different mode of operation when the mobile device 182 has snapped to the beacon signal of that control device. The different mode of operation may be a low power mode of operation, as described herein. For example, the mobile device 182 may transmit a digital message to the control device via the short-range RF communication link. The digital message may cause the control device to enter the different mode of operation. While in the different mode of operation, the control device may cease transmitting the beacon signals 185 or the control device may transmit the beacon signals 185 at a lower power level. For example, the control device may cease transmitting beacon signals 185, or transmit the beacon signal 185 at a lower power level, to consume less power and/or to reduce RF traffic on the short-range RF communication link. In the different mode of operation, the control device may cease transmitting the beacon signals 185, or may transmit the beacon signals 185 at a lower power level, when the mobile device 182 has snapped to the beacon signal of that control device. The control devices ceasing to transit the beacon signals 185, or transmitting the beacon signals 185 at a lower power level, may hinder other mobile devices from hearing the beacon signals 185 from that control device and attempting to snap to that beacon signal. In the different mode of operation, the control device may transmit additional or alternative data in the beacon signal 185. For example, the control device may include an indication that the mobile device 182 has snapped to the beacon signal of that control device (e.g., which may hinder other mobile devices from trying to snap to that beacon signal). The other mobile devices that identify that the mobile device 182, or a predefined number of devices, have snapped to the beacon signal may avoid snapping to the beacon signal and/or displaying the beacon as being an available option.

The system controller 110 may cause the control device to operate in the second mode of operation during the configuration procedure of the load control system. For example, the system controller 110 may cause the control device to operate in the second mode of operation after an association procedure of the control device capable of transmitting the beacon signals 185. The association procedure may include the system controller 110 receiving information (e.g., location, identifiers, etc.) of the load control devices and/or the input devices to access and control the associated load control devices. The mobile device 182 may send digital messages via the system controller 110 to control the load control devices associated with the unique identifier. For example, the system controller 110 may transmit a digital message to the control device to cause the control device to enter the second mode of operation after the association procedure. The control device may cease transmitting the beacon signals 185 and/or transmit the beacon signals 185 at a lower power level in the second mode of operation, for example, to consume less power and/or reduce RF traffic on the short-range RF communication link. Ceasing to transit the beacon signals and/or transmitting the beacon signals at a lower power level may hinder the mobile device 182 from hearing the beacon signals from that control device. For example, ceasing to transit the beacon signals 185 and/or transmitting the beacon signals 185 at a lower power level may hinder the mobile device 182 from hearing the beacon signals 185 from that control device while trying to associate other control devices during the configuration procedure.

The system controller 110 may determine the location of the mobile device 182 using triangulation. The load control devices of the load control system 100 may be mounted in fixed locations. The load control devices may measure the signal strength of RF signals received from the mobile device 182. The load control devices may transmit these signal strengths to the system controller 110. The system controller 110 may determine the location of the mobile device 182 using the signal strengths. One or more load control devices of the load control system 100 may be movable devices. As such, the load control system 100 may include fixed and movable load control devices.

The lighting control devices of the load control system 100 (e.g., the dimmer switches 120 and the LED drivers 130) may control the respective lighting loads (e.g., the lighting loads 122 and the LED light sources 132) in order to transmit a visible light communications (VLC) signal via the light emitted by the lighting loads. The lighting control devices may transmit beacon signals via the VLC signals emitted by the lighting loads. The beacon signals transmitted by the lighting control devices via the VLC signals may each include a unique identifier identifying the location of the lighting control device that transmitted the beacon signal (e.g., similar to the RF beacons transmitted via the short-range or low-power RF communication link). The mobile device 182 may include a visible light sensor 183. The visible light sensor 183 may include a camera, an ambient light detector, or other photosensitive circuit for receiving the VLC signals. The mobile device 182 may receive a beacon signal via the VLC signals when located near a lighting load that is presently transmitting the beacon signal, and transmit the unique identifier to the system controller 110, which may determine the location of the mobile device using the unique identifier.

One or more of the control devices of the load control system 100 may transmit beacon signals via acoustic signals. For example, the control devices may include acoustic signal generators and speakers for generating the acoustic signals. The beacon signals transmitted by the control devices via the acoustic signals may include a unique identifier identifying the location of the control device that transmitted the beacon signal (e.g., similar to the RF beacons and VLC beacons). The mobile device 182 may include a microphone for receiving the acoustic signals. The mobile device 182 may receive a beacon signal via the acoustic signals when located near a control device that is presently transmitting the beacon signal, and transmit the unique identifier to the system controller 110, which may determine the location of the mobile device using the unique identifier.

The system controller 110 may determine the location of the occupant 180 without the need to track the location of the mobile device 182. For example, the system controller 110 may determine the location of the occupant 180 in response to one or more input device fixedly mounted in one or more of the rooms 102, 104, 106. For example, a camera device 176, a microphone 196, a keycard device 166, or a biometric sensing device 168 (e.g., fingerprint detection device, retinal scanning device, etc.) may be fixedly mounted in one or more of the rooms 102, 104, 106 and may assist the system controller 110 in determining the location of the occupant 180. The load control system 100 may include one or more camera devices 176 for recording video surveillance of the rooms 102, 104, 106. Each camera device 176 may transmit video recordings to the system controller 110. The system controller 110 may determine the presence of the occupant 180 in the room 104, for example, using facial recognition technology.

The system controller 110 may determine the location of the occupant 180 using a microphone. For example, the system controller 110 may determine an occupant of a space based on matching voice patterns of the occupant 180 to a database of stored voice patterns. The voice patterns may be used in addition to a determined location of the occupant's mobile device 182 for confirmation of the occupant's presence.

The system controller 110 may determine an occupant 180 of a space based on biometric data (e.g., fingerprint detection, retinal scanning, etc.). For example, a control-source device (e.g., a dimmer switch) may include a fingerprint detection module. Upon receiving information relating to an occupant's fingerprint, the control-source device may transmit this information to the system controller 110, which may cross-reference the occupant's fingerprint information with a dataset (e.g., database) to determine the occupant 180 of the space.

The system controller 110 may use location information determined by the mobile device 182 to supplement information received from one or more control devices. For example, the system controller 110 may use location information determined by the mobile device 182 to supplement occupancy sensor information. For example, an occupancy sensor may be unable to detect the presence of the occupant 180 in a space due to a lack of line of sight between the sensor and the occupant. The system controller 110 may detect the presence of the occupant based on the presence of the occupant's mobile device 182. The system controller 110 may use location information based on a mobile device 182 to enhance occupancy sensor zone control. For example, the location information relating to the mobile device 182 may be used to determine and/or confirm zoning information as determined by an occupancy sensor.

The system controller 110 may control (e.g., automatically control) the load control devices in response to determining the location of the mobile device 182. For example, the system controller 110 may control the load control devices in response to determining the location of the mobile device 182 when one of the occupancy sensors 172 indicates that the space (e.g., room), which was indicated as the location of the mobile device 182, is occupied. The mobile device 182 may receive a digital message indicating the occupancy condition from one of the occupancy sensors 172, to determine that the occupancy sensor is located in the room in which the mobile device 182 is located, and/or to transmit a command to control the load control devices in the response to receiving the digital message indicating the occupancy condition (e.g., transmitted to the system controller 110 or to the load control devices). The system controller 110 may determine whether the location of the mobile device 182 is occupied. For example, the system controller 110 may determine whether the location of the mobile device 182 is occupied in response to a motion sensor, a proximity sensor, a door entrance sensor, a door movement sensor, a keypad door-opening device 167, and/or the camera device 176. The system controller 110 may control (e.g., automatically control) the load control devices when the location of the mobile device 182 is indicated as occupied.

A sensor (e.g., an occupancy sensor) may control the status of a control-target device (e.g., turn lights on/off, raise/lower shades, etc.). The system controller 110 may determine and/or set the preset level of the control-target device based on the detection of a mobile device 182 within the space of the control-target device. For example, an occupancy sensor may turn the lighting of a space on/off based on the detection of an occupant, and/or the system controller 110 may set the lighting to the preset of the occupant 180 based on the detection of the occupant's mobile device 182 within the space of the control-target device.

A sensor (e.g., an occupancy sensor) may control the status of a control-target device in one direction (e.g., turn lights on/off, raise/lower shades, etc.). The system controller 110 may control the status of the control-target device in the other direction. For example, the system controller 110 may turn lighting of a space on based on determining that an occupant is present in the space (e.g., via their mobile device), and/or the sensor may turn the lighting of the space off based on a detected vacancy situation in the space.

The mobile device 182 may determine its location and to transmit the location information to the system controller 110 and/or the load control devices. The mobile device 182 may determine its location in response to the beacon signals received when the mobile device 182 is located near a control device that is presently transmitting the beacon signal. The mobile device 182 may use the unique identifier of the beacon signal to retrieve the location of the mobile device 182 via the Internet 192. The mobile device 182 may transmit the location of the mobile device 182 to the system controller 110. The system controller 110 may control (e.g., automatically control) the load control devices in response to the location of the mobile device 182. The mobile device 182 may determine its location based on the signal strengths of RF signals received from multiple (e.g., three or more) of the load control devices. The mobile device 182 may determine its location based on a global positioning system (GPS) receiver.

An input device (e.g., the battery-powered remote control devices 170, the occupancy sensors 172, and/or the daylight sensors 174) may determine its location. The input device may determine its location in response to determining a signal strength signature at the present location. The signal strength signature may be a pattern of signal strength measurements to and from the fixed-location control devices (e.g., the load control devices) of the load control system 100. The input device may use a neural network to learn a signal strength signature in each of the rooms 102, 104, 106. For example, the input device may learn the signal strength signature using signal strengths measured when the input device is in one of the rooms 102, 104, 106 during a configuration or setup procedure of the load control system 100 to determine the weights of the neural network that will allow the input device to recognize these patterns. The input device may alter its operation in response to the determined location and/or transmit the determined location to the load control devices and/or system controller 110. The input devices and/or the system controller 110 may determine the locations of the input devices using any of the procedures described herein.

The mobile device 182 and/or the input devices (e.g., such as the battery-powered remote control devices 170) may operate differently depending upon the present location of the device. The mobile device 182 may display a control screen (e.g., on a visual display) that allows for control of the electrical loads located near the location of the mobile device 182. The control screen may be displayed when a control application on the mobile device 182 is opened. The control screen may be displayed without opening the control application, for example, on a lock screen, a notification screen, or a "glance" screen. The system controller 110 may transmit location-dependent control elements (e.g., the determined location and/or names of an area, groups, zones, electrical loads, control devices, load control devices, input devices, presets, and/or scenes associated with the location) to the mobile device. The mobile device 182 may display the location-dependent control elements on the display screen (e.g., as "soft" buttons), and may transmit selected control elements (e.g., selected location-dependent control elements) to the system controller 110. For example, if the mobile device 182 is located in a conference room, the control screen may display the name of the conference room, one or more scenes for the conference room, and/or specific zones of the conference room. The mobile device 182 may display generic control elements on the control screen (e.g., without the need for the system controller 110 to transmit location-dependent control elements to the mobile device 182). For example, in an open office area, the generic control elements for each cubicle may be the same (e.g., an on control element, an off control element, a raise control element, and a lower control element). The mobile device 182 may transmit the selected control element to the system controller 110. The system controller 110 may store the selected control elements (e.g., may store the selected control elements in a dataset). The system controller 110 may determine the command to transmit to the desired load control devices depending upon the determined location of the mobile device.

When the control application on the mobile device 182 is opened, the mobile device may display a home screen that is dependent upon the location of the mobile device 182. For example, the mobile device 182 may display a "living room" home screen when the mobile device 182 is presently located in the living room. The mobile device 182 may launch a particular application and/or screen of an application based on the location of the mobile device 182. For example, if the mobile device 182 detects that it is in a conference room, the mobile device 182 may launch a particular application and/or screen of an application that allows for control of the particular loads of the conference room (e.g., HVAC, lighting, blinds, etc.).

The mobile device 182 may re-order lists or formats of electrical loads, load control devices, input devices, control buttons, and/or presets displayed on the visual display in response to the location of the mobile device 182. For example, the mobile device 182 may re-order lists or formats of electrical loads, load control devices, input devices, control buttons, and/or presets to put the items having a predetermined priority for that location near the top of the list. The predetermined priority may be based on the frequency of use, proximity to the mobile device 182, compatibility, type, etc. For example, lighting control devices may be provided a higher priority than motorized window treatments. The mobile device 182 may display messages and/or warnings to the occupant 180 depending upon the present location. For example, the mobile device 182 may display messages and/or warnings to the occupant 180 to inform the occupant 180 of burnt-out lamps or faulty control devices in the present room. The mobile device 182 may be able to display a warning when the time-of-day pricing for electricity has exceeded a predetermined threshold.

Figure 2:
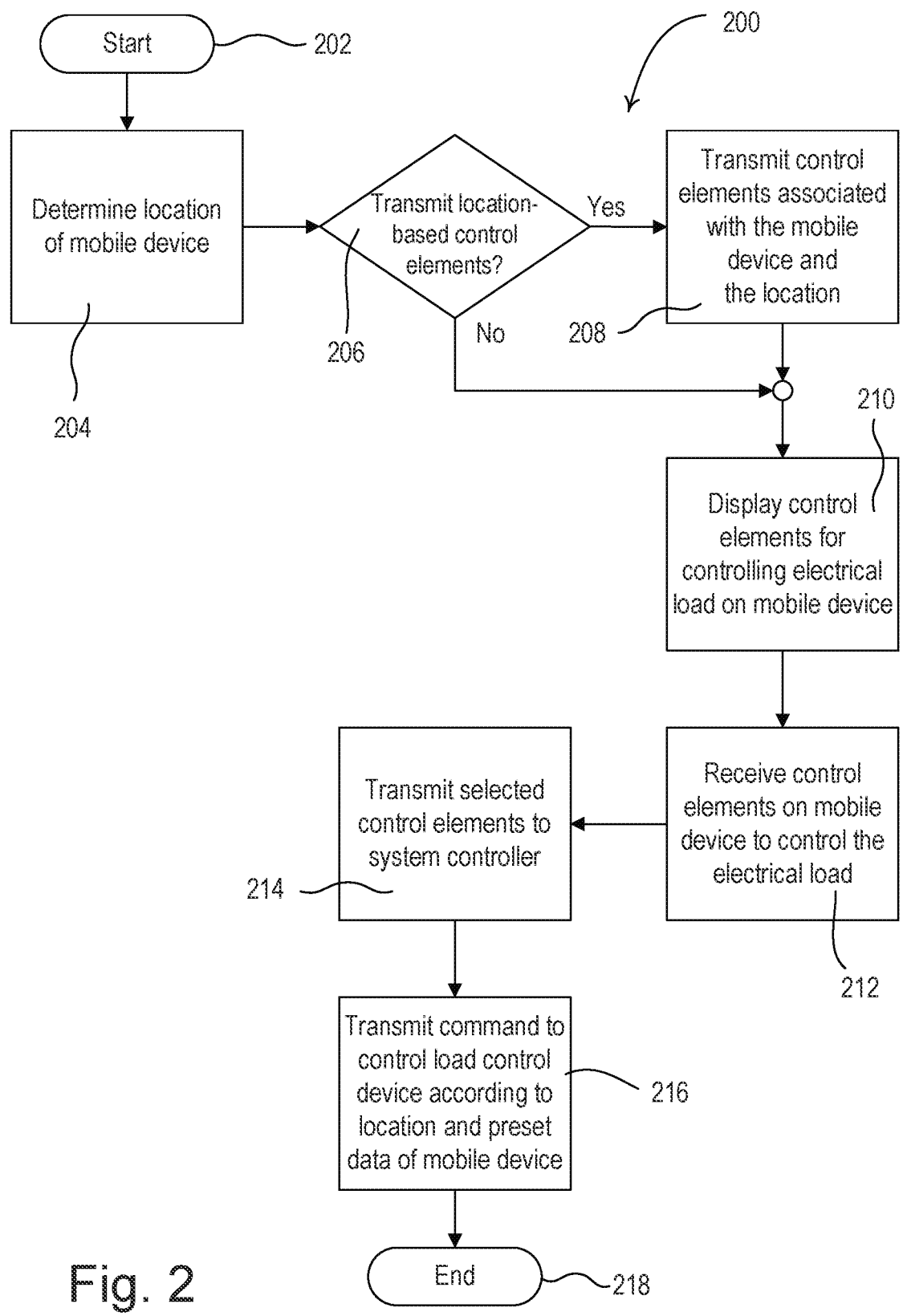
FIG. 2 is a flowchart of an example control procedure for controlling electrical loads in response to the location of a mobile device and/or an occupant.

FIG. 2 is a flowchart of an example control procedure 200 for controlling electrical loads in response to the location of the mobile device 182. At 202, the example control procedure 200 may start. At 204, the location of the mobile device 182 may be determined. For example, the location of the mobile device 182 may be determined at 204 by the mobile device 182 receiving a beacon signal, the mobile device transmitting a unique identifier of the beacon signal (e.g., a beacon ID) to the system controller 110, and the system controller 110 determining the location of the mobile device 182 using the beacon ID. The system controller 110 may determine a location of a mobile device 182 using one or a combination of triangulation, received signals from the mobile device 182, a sensor, a camera, beacon signals, a microphone, a keycard, biometric data, and/or the like.

Location-based control elements (e.g., the determined location and/or names of areas, groups, zones, electrical loads, control devices, load control devices, input devices, presets, and/or scenes associated with the location) may be transmitted to the mobile device 182, at 206. For example, the system controller 110 may transmit location-based control elements to the mobile device 182 to provide control of the electrical loads at the location of the mobile device 182. If the location-based control elements are determined to be transmitted to the mobile device at 206 (e.g., in order to provide control of the electrical loads at the location of the mobile device 182), the system controller 110 may transmit control data associated with the mobile device and the location of the mobile device 182 to the mobile device 182, at 208.

The location-based control elements may be requested and/or required by the mobile device 182. The location-based control elements may be transmitted based on the location of the mobile device 182. The mobile device 182 may receive the location-based control elements and display the location-based control elements on the visual display of the mobile device 182, at 210. For example, the mobile device 182 may display the location-based control elements on the visual display to allow for control of the electrical loads near the location of the mobile device. The mobile device 182 may reconfigure the display configuration of the location-based control elements on the visual display in response to the location of the mobile device. For example, if the mobile device 182 is located in a conference room, the control screen may display the name of the conference room, one or more scenes for the conference room, and/or specific zones of the conference room. If the mobile device 182 is located in a living room, the control screen may display the name of the room (e.g., living room), one or more control devices located within the living room, and/or one or more scenes of the living room.

At 212, the mobile device 182 may receive a selection of one or more of the location-based control elements on the visual display of the mobile device 182. For example, the mobile device 182 may receive an indication of a button press to turn the load on or off, or to select a preset or scene, on the visual display of the mobile device 182, at 212. An indication may be received of an actuation of a virtual slider on the visual display of the mobile device 182 to adjust the amount of power delivered to the electrical load (e.g., to adjust an intensity of a lighting load) at 212. At 214, the mobile device 182 may transmit the selected control element (e.g., a command to control the electrical load) to the system controller 110. At 216, the system controller 110 may transmit a digital message to one or more of the load control devices (e.g., lighting loads) according to the location of the mobile device 182 and/or the preset data of the mobile device 182. For example, the system controller 110 may transmit a digital message to one or more of the load control devices within a predefined proximity of the mobile device 182 to control the electrical loads. The control procedure 200 may exit, at 218. The digital message transmitted at 216 may include a command to control the electrical load according to the determined location of the mobile device 182 and/or the occupant control parameters stored in the mobile device.

If the location-based control elements are not to be transmitted, at 206 (e.g., based on the location of the mobile device 182, or a request or requirement of the mobile device), the mobile device 182 may display the generic control elements on the visual display of the mobile device, at 210, to allow for control of the electrical loads near the location of the mobile device. For example, if the mobile device 182 is located in an open office, the control screen may display the same generic control elements for each cubicle of office space. The mobile device 182 may receive a selection of one or more of the generic control elements on the visual display of the mobile device 182, at 212, and the mobile device 182 may transmit the selected control element to the system controller 110, at 214. At 216, the system controller 110 may determine a corresponding command in response to the selected control elements and the location of the mobile device 182 and then transmit a digital message, including the command, to one or more of the load control devices within a predefined proximity of the location of the mobile device 182. The control procedure 200 may exit, at 218. For example, The battery-powered remote control devices 170 may transmit different digital messages in response to the actuation of a single button depending upon the location of the remote control device. For example, actuation of a preset button of one of the remote control devices 170 may select a first preset when the remote control device is located in a first room and may select a second preset when the remote control device is located in a second room.

Figure 3:
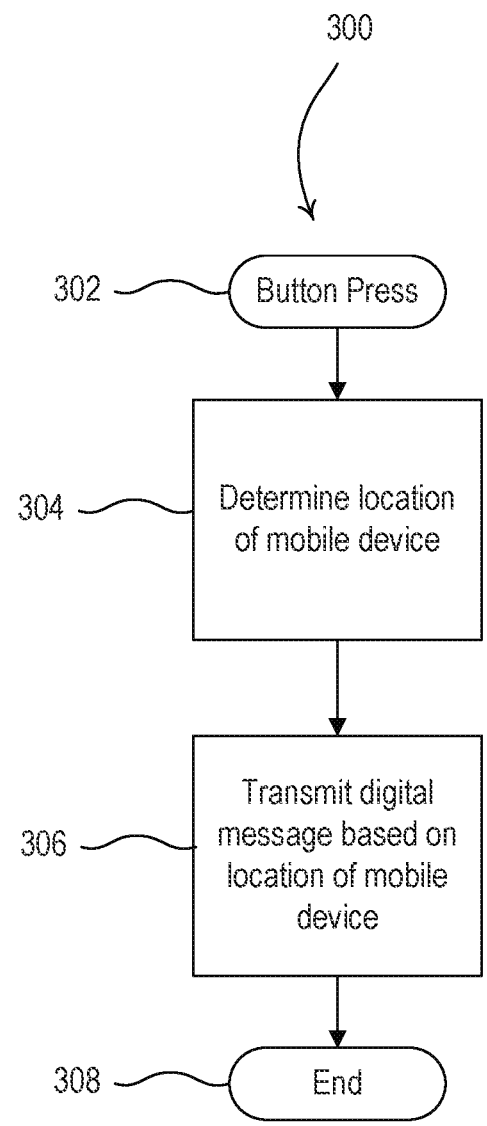
FIG. 3 is a flowchart of an example button press procedure that may be executed by a remote control device.

FIG. 3 is a flowchart of an example button press procedure 300 that may be executed by a remote control device 170 and/or a mobile device 182. At 302, a button on a remote control device 170 and/or a mobile device 182 may be actuated. At 304, the remote control device 170, the mobile device 182, and/or the system controller 110 may determine the location of the remote control device 170 or the mobile device 182. For example, the remote control device 170 or the mobile device 182 may transmit different digital messages in response to the actuation of a single button depending upon its location. The system controller 110 may store commands corresponding to the one or more locations (e.g., one or more different locations). The system controller 110 may perform a lookup of commands, based on the location of the remote control device 170 or the mobile device 182. For example, a preset of a conference room may increase or decrease the intensity of a control device in a smaller increment (e.g., 10%) than a preset of an office (e.g., 30%). The user may increase or decrease the intensity of the control device in the conference room at 10%, and the intensity of the control device in the office at 30%, using the same or similar button actuation (e.g., using the lookup). At 306, the remote control device 170, the mobile device 182, and/or the system controller 110 may transmit a digital message based on the location of the remote control device 170 or the mobile device 182. At 308, the example button press procedure 300 may end.

The system controller 110 may control (e.g., automatically control) the load control devices in response to determining the location of the mobile device 182 and/or the occupant 180. As previously described, the system controller 110 may control the load control devices according to occupant control parameters associated with the occupant 180. The occupant control parameters may be the occupant's predetermined and/or preset settings that may be stored on the mobile device 182 and/or on the system controller 110. The occupant control parameters may be the occupant's biometric data that sensed by the mobile device (e.g., when the mobile device is a wearable device). The occupant control parameters may be the occupant's input data that may be received via the mobile device. A preset setting may identify preset lighting intensities of the lighting loads, preset positions of the motorized window treatments 150, and/or preset setpoint temperatures of the temperature control devices 160.

The system controller 110 may control the load control devices in the rooms according to the occupant control parameters. For example, the system controller 110 may control the load control devices in the rooms according to the occupant control parameters as the occupant moves around the building (e.g., to "follow" the occupant around the building). The occupant control parameters may be "universal" parameters. For example, the preset settings may be the same for each room of the building. The occupant control parameters may be room parameters. For example, the present settings may be different for each room. The occupant control parameters may be temporally based. For example, the occupant control parameters may be determined based on the time of day and/or year. For example, the lighting loads 122 and LED light sources 132 may be illuminated (e.g., may automatically be illuminated) dimly when controlled (e.g., automatically controlled) at night in response to the location of the mobile device 182 and/or occupant 180. The level at which the load control devices and/or electrical loads are controlled may be dependent upon the distance from the mobile device 182 and the controlled load control device and/or the electrical load. The occupant control parameters may be different for different occupants of the rooms. For example, because the mobile device 182 may uniquely identify the occupant 180, the occupant control parameters may be different for different occupants of the rooms.

Figure 4:
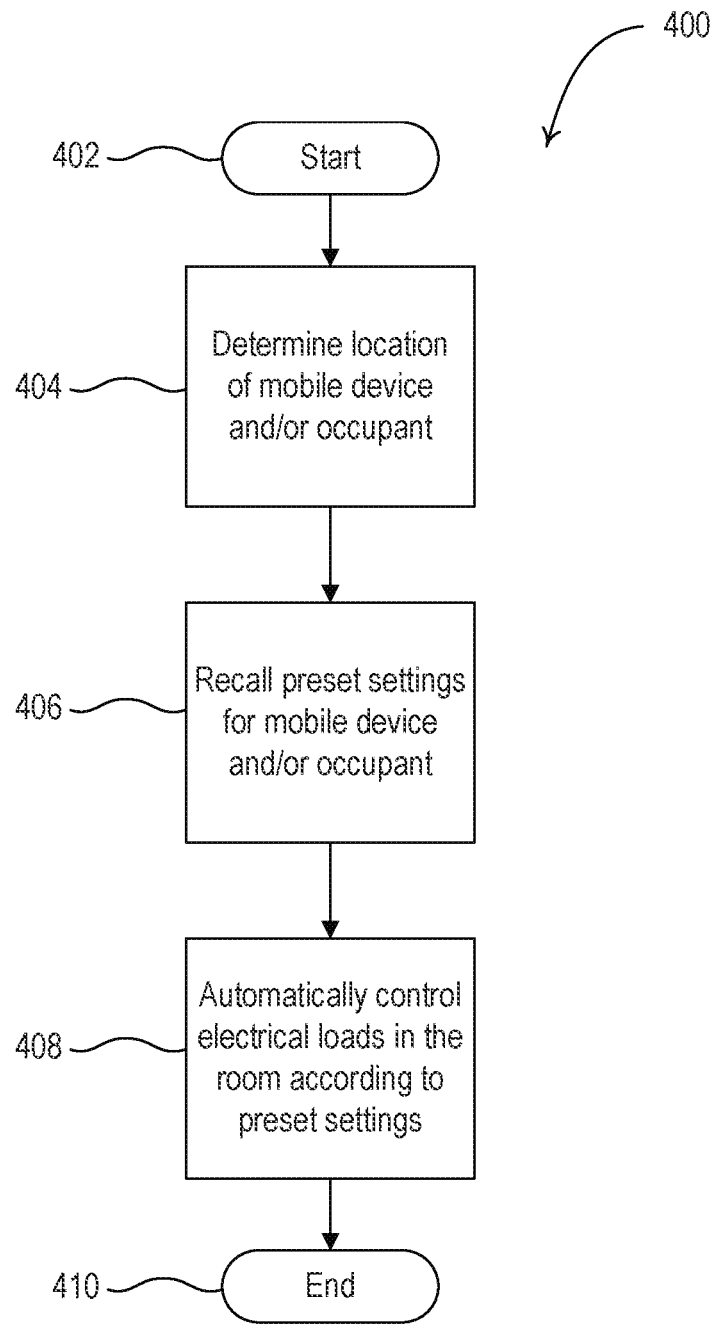
FIG. 4 is a flowchart of an example control procedure for controlling electrical loads in response to the location of a mobile device and/or an occupant.

FIG. 4 is a flowchart of an example control procedure 400 for controlling (e.g., automatically controlling) electrical loads in response to the location of the mobile device 182 and/or the occupant 180. The control procedure 400 may be executed by the system controller 110, the mobile device 182, and/or one or more control devices. At 402, the example control procedure 400 may start. At 404, a location of a mobile device 182 and/or occupant 180 may be determined. For example, the system controller 110 may determine a location of a mobile device 182 and/or occupant 180. A location of a mobile device 182 and/or occupant 180 may be determined using one or more of triangulation, received signals from the mobile device 182, a sensor, a camera, beacon signals, a microphone, a keycard, biometric data, and/or the like.

At 406, present settings based on the mobile device 182 and/or occupant 180 may be recalled. For example, the system controller 110 may recall (e.g., load) preset settings based on the mobile device 182 and/or occupant 180, as described herein. At 408, electrical loads in the space (e.g., room) may be controlled according to the recalled preset settings of the mobile device 182 and/or occupant 180. For example, the system controller 110 may control (e.g., automatically control) electrical loads in the space (e.g., room) according to the recalled preset settings of the mobile device 182 and/or occupant 180. The system controller 110 may automatically control electrical loads in the room according to predetermined or preset settings for the occupant 180, which may be room specific settings. At 410, the example control procedure 400 may end.

A verification signal may be received (e.g., the system controller 110 and/or the mobile device 182 may receive a verification signal). For example, a verification signal may be received in addition to receiving the beacon signals. The verification signal may be received in order to ensure that the mobile device 182 is located in the determined location. For example, the verification signal may be a location verification signal. The beacon signals may be transmitted via a wireless medium. The beacon signals may be transmitted via a short-range RF communication link (e.g., BLE, NFC, etc.), which may result in the beacon signals being transmitted through the surrounding structure (such as the walls of a building). If an occupant is in a room and the occupant's mobile device 182 receives a beacon signal from an adjacent room (e.g., room 104), the system controller 110 may determine (e.g., mistakenly determine) that the occupant is in the adjacent room (e.g., room 104).

To provide additional verification capabilities, the verification signal may be transmitted via a wireless medium. The verification signal may be transmitted via a wireless medium that is different than the beacon signal. For example, the verification signal may be hindered by a surrounding structure (such as the walls of the building). The verification signal may include visible light communication (VLC) signals and/or acoustic signals. The VLC and/or acoustic signals may be hindered by surrounding structures. As such, surrounding structures may hinder (e.g., reduce the magnitude of) or prevent a VLC and/or an acoustic signal from traveling beyond a surrounding structure. For example, a wall positioned between adjacent rooms may hinder or prevent a VLC and/or an acoustic signal from traveling from one room to another room, and thus being received (e.g., such as mistakenly received) by a control device is the other room. Thus, VLC and/or acoustic signals may be used to verify that a beacon signal received within a room was transmitted from within that room. For example, VLC and/or acoustic signals may be used to verify that a beacon signal received within a room was intended to be received within that room.

The verification signal may include a unique identifier that indicates the location of the control device transmitting the verification signal. For example, the mobile device 182 may receive RF beacon signals from control devices located in adjacent rooms (e.g., rooms 102 and 104) and may receive the verification signal from a control device located in one of the rooms. The system controller 180 may conclude that the mobile device 182 is located in the room identified by the verification signal, as one of the received RF signals and the verification signal both identify the same room. For example, the verification signal may be a VLC signal transmitted by a lighting load (e.g., the lighting loads 122 controlled by the dimmer switch 120 and/or the LED light sources 132 controlled by the LED drivers 130) located in the same space as the occupant. In addition, or alternatively, the verification signal may be an acoustic signal transmitted by a control device located in the same space as the occupant. One or more verification signals may be implemented. Though the VLC signal and the acoustic signal are described as being verification signals, the RF beacon signal may verify the location being identified primarily in the VLC signal and/or the acoustic signal.

Figure 5:
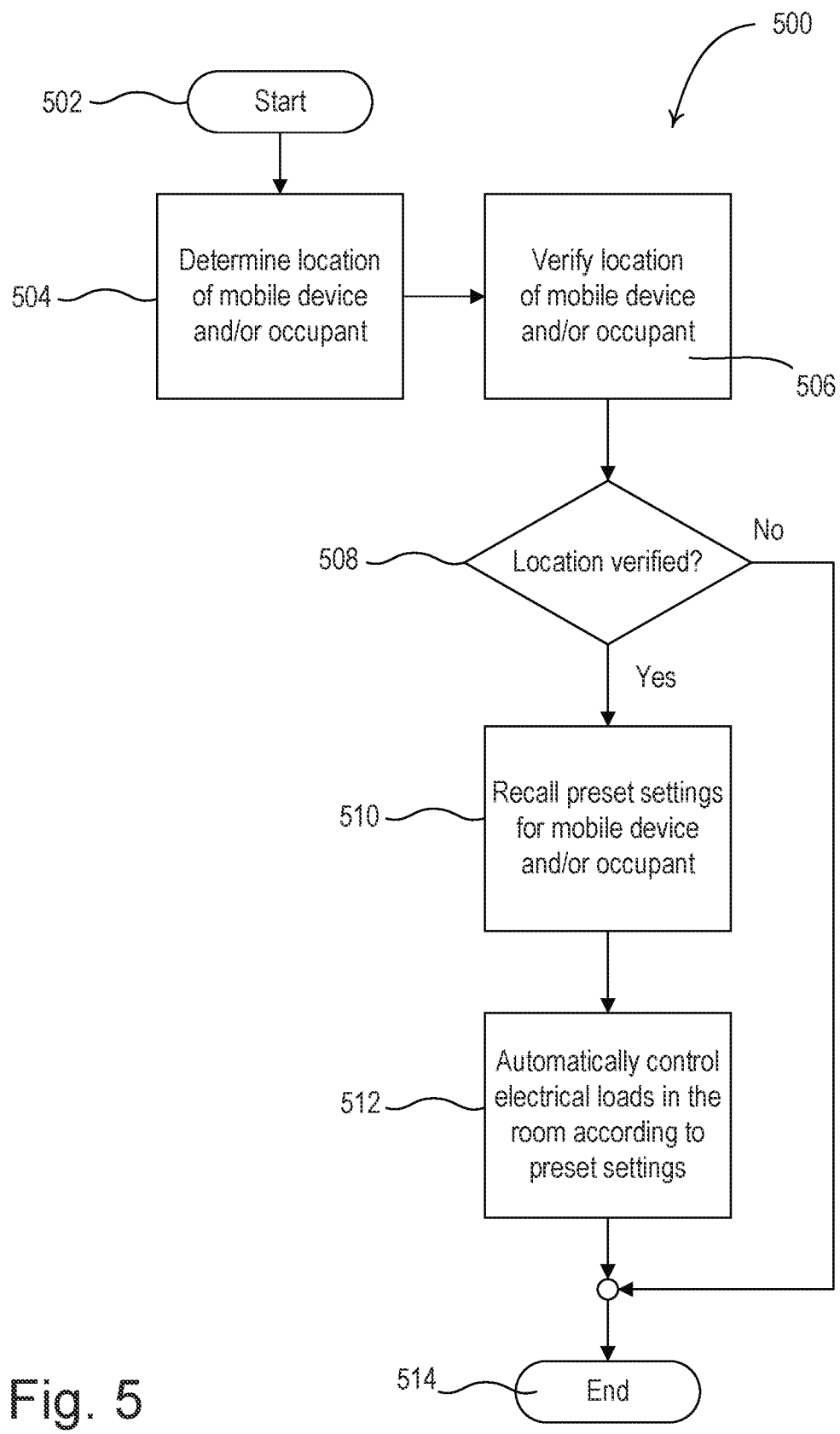
FIG. 5 is a flowchart of another example control procedure for controlling electrical loads in response to the location of a mobile device and/or an occupant.

FIG. 5 is a flowchart of another example control procedure 500 for controlling (e.g., automatically controlling) electrical loads in response to the location of the mobile device 182 and/or the occupant 180. The control procedure 500 may be executed by the system controller 110, the mobile device 182, and/or one or more control devices. At 502, the example control procedure 500 may start. At 504, a location of a mobile device 182 and/or occupant 180 may be determined. For example, the system controller 110 may determine a location of a mobile device 182 and/or occupant 180. A location of the mobile device 182 and/or occupant 180 may be determined in response to a unique identifier of an RF beacon signal received by the mobile device via a wireless communication medium. For example, the system controller 110 may determine a location of the mobile device 182 and/or occupant 180 in response to a unique identifier of an RF beacon signal received by the mobile device via a wireless communication medium (e.g., via a short-range RF communication link, such as BLE, NFC, or the like).

At 506, the location of the mobile device 182 and/or occupant 180 may be verified. For example, the system controller 110 may verify the location of the mobile device 182 and/or occupant 180. A verification signal may be received via a different wireless communication medium. For example, the system controller 110 and/or the mobile device 182 may receive a verification signal via a different wireless communication medium (e.g., via visible light signals and/or acoustic signals). A location associated with the verification signal may be determined in response to a unique identifier of the verification signal. It may be verified whether the location associated with the verification signal is the same location as determined from the RF beacon signal. If the location is verified, at 508, preset settings may be recalled (e.g., loaded), at 510, based on the mobile device 182 and/or occupant 180, as described herein. At 512, electrical loads may be controlled (e.g., automatically controlled) in the space (e.g., room) according to the occupant control parameters of the mobile device 182 and/or occupant 180 (e.g., as stored on the mobile device). For example, the system controller 110 may automatically control electrical loads in the room according to predetermined or preset settings for the occupant 180, which may be room specific settings. At 514, the example control procedure 500 may end. If the location is not verified at 508, the example control procedure 500 may exit without controlling the electrical loads, or by implementing default settings.

When there are multiple occupants in a single room, the system controller 110 may determine an identify of each of the multiple occupants and to control (e.g., automatically control) one or more of the load control devices according to the occupant control parameters associated with each of the multiple occupants. For example, the system controller 110 may control (e.g., automatically control) one or more of the load control devices using a priority (e.g., a predetermined priority, such as a tiered hierarchy) of occupants to determine which occupant's preset settings get priority. For example, the system controller 110 may control the load control devices to a preset setting of the mobile device and/or occupant in the room that has the highest priority. The priorities and/or tiered hierarchy may be determined during a configuration procedure of the load control system 100 and may be stored in memory in the system controller 110. The priority may be based on the location of the occupants within the space. For example, the occupant closest to a door or window or an occupant that is furthest from a door or window may be assigned the highest priority. The occupant closest to the load control device may be assigned the highest priority, the occupant closest to the load may be assigned the highest priority, etc. The priority may be based on the order in which the occupants entered the space. For example, the system controller 110 may control one or more of the load control devices using the preset data and/or user input received from the mobile device of the occupant to enter the space earlier. The priority may be determined from a manual request to control the loads of the room. For example, the priority may be determined from a manual request to control the loads of the room using the mobile device of the occupant. An occupant may relinquish control of the loads in the room using the mobile device (e.g., manually select an input to relinquish control).

Figure 6:
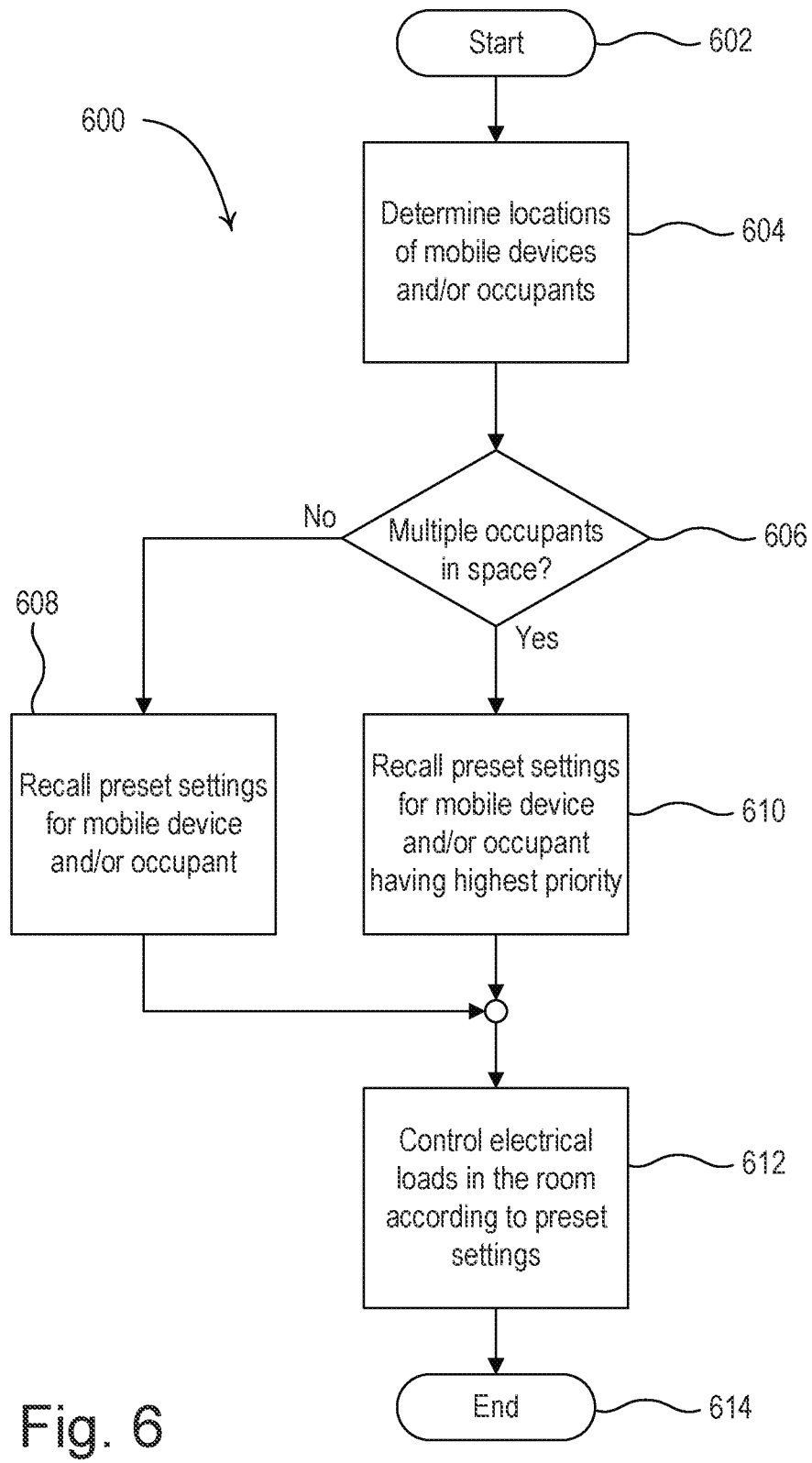
FIG. 6 is a flowchart of an example control procedure for controlling electrical loads in response to the location of one or more mobiles devices and/or occupants when there may be multiple mobile devices and/or occupants in a single space.

FIG. 6 is a flowchart of an example control procedure 600 for controlling (e.g., automatically controlling) electrical loads in response to the location of one or more mobiles devices and/or occupants when there may be multiple mobile devices and/or occupants in a single space. The control procedure 600 may be executed by the system controller 110, the mobile device 182, and/or one or more control devices. At 602, the example control procedure 600 may start. At 604, the location of one or more mobile devices 182 and/or occupants 182 may be determined. For example, the system controller 110 may determine the location of one or more mobile devices 182 and/or occupants 182, as described herein. At 606, it may be determined whether there are multiple occupants in the space. For example, the system controller 110 may determine if multiple occupants are in the space. Occupancies of the space may be determined based on the presence of an occupant's mobile device 182, a sensor, etc. If, at 606, it is determined that there is one occupant 180 in the space, then, at 608, preset settings for the mobile device 182 and/or the occupant 180 may be recalled accordingly. For example, the system controller 110 may recall preset settings for the mobile device 182 and/or the occupant 180 accordingly, as described herein.

If it is determined that there are multiple occupants in the space, at 606, then, at 610, the system controller 110 may recall preset settings for the mobile device 182 and/or the occupant 180 having the highest priority, as described herein. At 612, one or more control-target devices (e.g., electrical loads) may be controlled (e.g., automatically controlled) according to the preset settings of the occupant 180 having the highest priority. At 614, the example control procedure 600 may end.

The system controller 110 may control (e.g., automatically control) the load control devices according to the occupant control parameters (e.g., the occupant's preset settings) in response to determining the location of the mobile device 182. The system controller 110 may control (e.g., automatically control) the load control devices according to the occupant's preset settings in response to determining the location of the mobile device 182. The system controller 110 may control (e.g., automatically control) the load control devices according to the occupant's preset settings in response to determining that one of the occupancy sensors 172 has determined that the room in which the mobile device 182 is located is occupied.

Figure 7:
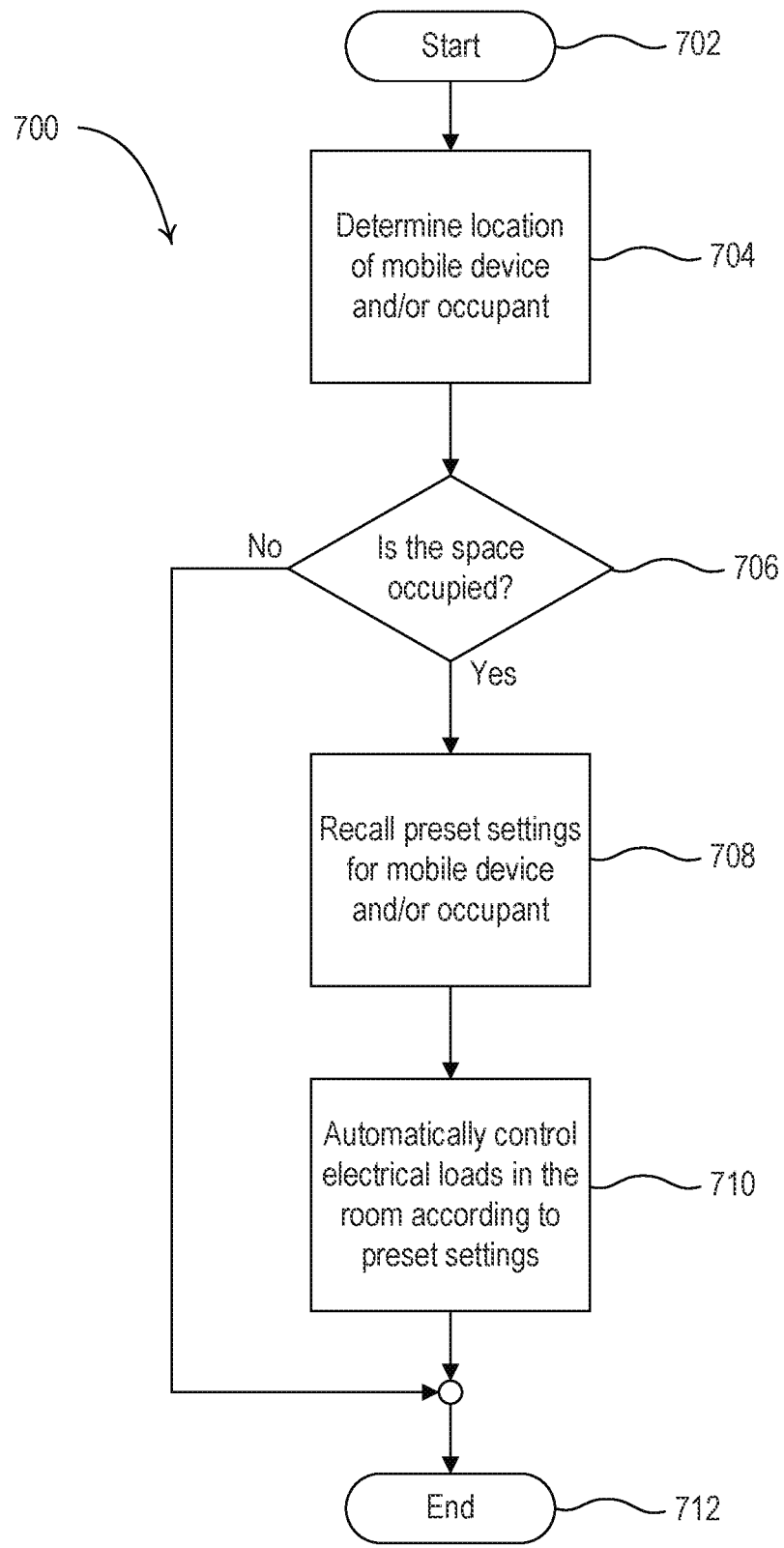
FIG. 7 is a flowchart of an example control procedure for automatically controlling electrical loads in response to the location of a mobile device and/or an occupant if the space in which the mobile device and/or occupant is located is occupied.

FIG. 7 is a flowchart of an example control procedure 700 for controlling (e.g., automatically controlling) one or more electrical loads in response to the location of the mobile device 182 and/or the occupant 180. The control procedure 700 may be executed by the system controller 110, the mobile device 182, and/or one or more control devices. The example control procedure 700 may start at 702. At 704, the location of one or more mobile devices 182 and/or occupants 182 may be determined. For example, the system controller 110 may determine the location of one or more mobile devices 182 and/or occupants 182. At 706, it may be determined whether the space is occupied. For example, the system controller 110 may determine whether the space is occupied using information from the one or more mobile devices 182, sensor information, a camera, beacon signals, a microphone, keycard data, biometric data (e.g., fingerprint detection), etc. If it is determined that the space is not occupied, at 706, then the example control procedure 700 may end, at 712.

If it is determined that the space is occupied, at 706, the system controller 110 may recall preset settings for a mobile device 182 and/or occupant 180 located in the space, at 708. If it is determined that the space is occupied, at 706, the system controller 1120 may control (e.g., automatically control) one or more control-target devices (e.g., controlling electrical loads) according to the preset settings, at 710. The system controller 110 may control one or more electrical loads in response to the location of the mobile device 182 and/or the occupant 180. For example, if the space in which the mobile device and/or occupant is located is occupied, the system controller 110 may control one or more electrical loads in response to the location of the mobile device 182 and/or the occupant 180. The system controller 110 may be configured to control the load control devices and/or electrical loads in a room to save energy when the mobile device 182 is not located in the room (e.g., by turning off or reducing the amount of power delivered to the load control devices and/or electrical loads).

The load control devices may be controlled according to the occupant's preset settings when the occupant 180 actuates a button on one of the load control devices (e.g., one of the dimmer switches 120) in the room in which the mobile device 182 is located. For example, the system controller 110 may control (e.g., automatically control) the load control devices according to the occupant's preset settings in response to determining the location of the mobile device 182 when the occupant 180 actuates a button on one of the load control devices (e.g., one of the dimmer switches 120) in the room in which the mobile device 182 is located. For example, the dimmer switch on which a button is actuated may determine the unique identifier of the mobile device 182 and to control the controlled lighting load in response to the occupant's preset settings (e.g., which may be stored in memory in the dimmer switch). The load control device on which a button is actuated may determine the unique identifier of the closest mobile device 182 if more than one mobile device 182 is determined to be present in a room. The closest mobile device 182 may be based on a ranging method (e.g., RSSI).

The preset settings for one or more occupants of the building may be learned. For example, the system controller 110 may learn the preset settings for one or more occupants of the building. For example, each time that an occupant turns on a specific lighting load (e.g., by actuating a button of the corresponding dimmer switch 120), the system controller 110 may store a desired intensity level to which the intensity of the lighting load was controlled. Each time that an occupant turns on a specific lighting load (e.g., by actuating a button of the corresponding dimmer switch 120), the system controller 110 may store the unique identifier of the mobile device 182 that is presently located in the room of the dimmer switch (e.g., and/or the mobile device 182 closest to the dimmer switch if more than one mobile device 182 is determined to be present in the room). If the occupant controls (e.g., repetitively controls) the lighting load to the same desired intensity level upon entering the room more than a predefined number of times (e.g., more than two consecutive times, a defined percentage of the time, etc.), the system controller 110 may store the desired intensity level as the preset level in the room for that occupant. When the actuator of the specific dimmer switch is actuated and the occupant's mobile device 182 is located in the room of the dimmer switch, the system controller 110 may cause the dimmer switch to control the intensity of the lighting load to the desired intensity level (e.g., the preset level) that is stored in memory. The system controller 110 may cause (e.g., automatically cause) the dimmer switch to control the intensity of the lighting load to the desired intensity level when the occupant's mobile device 182 enters the room of the dimmer switch (e.g., without required actuation of the button of the dimmer switch).

One or more load control devices and/or electrical loads may be controlled in response to detecting movement of an occupant 180. For example, the system controller 110 may control (e.g., predicatively control) one or more load control devices and/or electrical loads in response to detecting movement of an occupant 180. The direction in which the occupant 180 is moving (e.g., a trajectory of the occupant 180) may be determined and/or predicted. For example, the system controller may determine and/or predict the direction in which the occupant 180 is moving in response to detecting that the mobile device 182 is moving through the building. The system controller 110 may control the load control devices and/or the electrical loads at the determined and/or predicted destination of the occupant 180. For example, the system controller 110 may set the load control devices and/or the electrical loads to the occupant's preset settings at the determined and/or predicted destination of the occupant before the occupant 180 arrives at the destination. The system controller 110 may transmit to the mobile device 182 the location of the mobile device 182. The mobile device 182 may display the location of the mobile device 182 provided by the system controller 110. The system controller 110 may determine the location of rooms (e.g., conference rooms) and may provide a list of the rooms in an order. For example, the system controller 110 may provide a list of the conference rooms that are closest to the mobile device 182. The system controller 110 may determine whether the rooms (e.g., conference rooms) are available for use.

The determined and/or predicted destination of the occupant 180 may be learned. For example, the system controller 110 may learn the determined and/or predicted destination of the occupant 180 by monitoring the occupant's movements over a period of time (e.g., number of hours, days, weeks, etc.). For example, the occupant 180 may get up in the middle of each night and walk to the kitchen for a glass of water. The system controller 110 may detect the occupant's movements and the time of day, and the system controller 110 may predictively determine to turn on the lights in the kitchen and/or the lights along the pathway to the kitchen. The system controller 110 may increase the intensity of lights along a predicted path of an occupant 180. The system controller 110 may determine a path of an occupant 180 via a combination of triangulation and vector analysis. The system controller 110 may learn a direction that an occupant commonly takes. Setting of control devices may be based on a user preference (e.g., the learned direction that an occupant may commonly take). For example, if the system controller 110 determines that an occupant leaves his office and walks down the hall in the direction of a colleague's office more than a predefined number of times, then the system controller 110 may control the intensity of the lights to be greater when that occupant 180 leaves his/her office and his/her movement is determined to be in the direction of his/her colleague. The system controller 110 may use time of day to adjust the intensity of the predicted path.

The velocity and/or momentum of the mobile device 182 and/or occupant may be determined. For example, the system controller 110 may determine the velocity and/or momentum of the mobile device 182 and/or occupant 180 to control (e.g., automatically control) one or more load control devices and/or electrical loads in response to determining the velocity and/or momentum of the mobile device 182 and/or occupant 180. For example, the system controller 110 may turn lighting loads on or off quicker if an occupant 180 is moving at a fast pace through a building. The pace of an occupant may be compared to a threshold value. The threshold value may be a generic threshold value relating to a generic person's movement, and/or the threshold value may be a customized threshold value relating to a particular occupant's movement (e.g., based on previous paces performed by a particular occupant). In addition, or alternatively, the system controller 110 may determine that an occupant 180 is running (e.g., an emergency condition may be occurring) and turn each of the lighting loads on to full intensity in a space or in a direction of the occupant 180.

The system controller 110 may determine the location of a mobile device 182 and/or a remote control device 170 and react and/or respond when it is determined that the mobile device 182 and/or the remote control device 170 is in an authorized space and/or an unauthorized space (e.g., room, house, office building, etc.). For example, the system controller 110 may determine whether a device is attempting to control one or more control-target devices from an unauthorized location. The system controller 110 may determine whether a device is attempting to control one or more control-target devices from outside of a user's house, in an adjacent space or building, etc. The system controller 110 may track occupants within restricted areas using their mobile device 182. For example, if the system controller 110 determines that an occupant has entered a restricted area, the system controller 110 may sound an alarm (e.g., visual, audio, etc.), indicate to the occupant that they are in a restricted area (e.g., flash the lights), provide a message via the occupant's mobile device 182, etc. Each occupant may have a stored access level stored (e.g., on the mobile device 182, system controller 110, etc.) with an occupant identifier and/or mobile device identifier, which may correspond to access to different areas. In another example, an identifier of the authorized location and/or unauthorized locations may be stored with the occupant identifier and/or mobile device identifier.

The system controller 110 may provide access to control devices located within a designated area. For example, the system controller 110 may provide access to control devices located within an office to a designated user (e.g., a user to which the area is designated). A non-designated user (e.g., a user in which the area is not designated) may access the control devices if the designated user is not present. For example, if a designated user is not in his/her office, a non-designated user may access the control devices within the office, based on proximity of the non-designated user's mobile device 182 and the control devices within the office. A designated owner may provide or deny access of the control devices to one or more non-designated users. For example, a designated user may provide access to a non-designated user and/or deny access to another non-designated user. The designated user may provide access and/or deny access via notifications (e.g., push notifications). The notifications to provide access and/or deny access may be changed at a later time. For example, a designated user may provide access to a non-designated user and later revoke the provided access to the non-designated user.

The system controller 110 may provide access to control devices located within shared areas. For example, the system controller 110 may provide access to control devices located within a shared office and/or within a conference room. A user may use a mobile device 182 to request access to control devices located within a shared area when the mobile device 182 of the user is positioned within a predefined distance to the shared area. One or more mobile devices may assign ownership to a shared space. To assign ownership of a shared space, a user may be provided with privileges and/or a defined status (e.g., existing owner, administrator, etc.).

The owner of the space may use the mobile device 182 to designate another user as owner of the space, and/or the owner of the space may designate another user as a guest of the space. When another user is designated as owner of the space, the owners may be designated as co-owners. Two or more users and/or co-owners of a space may determine the use of control devices within a shared space. For example, two or more co-owners within a shared space may vote to determine the use of control devices within a shared space. Users having a defined status (e.g., super user, original owner) may be provided with an ability to override other user preferences with respect to the use of control devices within a shared space. For example, users having a defined status may veto proposed uses of control devices and/or users having a defined status may be provided additional voting rights when defining uses of control devices within a shared space.

The system controller 110 may provide rules for accessing control devices within a shared area (such as a conference room). The access to the control devices may be exclusive access to the control device or shared access to the control device. The system controller 110 may provide exclusive access of the control devices within a shared area to the first mobile device to attempt access to the area. For example, the system controller 110 may provide access of the control device within a shared area to the first mobile device that books the shared area within a calendar software. The system controller 110 may provide access of the control device within a shared area to all users having a mobile device and/or the system controller 110 may provide access of the control device within a shared area based on a seniority (e.g., the most senior requester of the control devices within a shared area may have access to the control devices). The mobile device 182 that is closest to the control device may have access to the control device. The access to the control device within a shared area may be provided (e.g., handed off) to another user. For example, a user that is accessing a control device may hand control to another user by selecting the other user from a list of users and/or by each of the users tapping the others mobile device.

The system controller 110 may track occupants via their mobile device 182 during an emergency. For example, the system controller 110 may determine whether one or more occupants are in a building during an emergency. If the system controller 110 determines that one or more occupants are in a building during an emergency, the system controller 110 may determine the spaces (e.g., floors, rooms, etc.) in which the occupants are located. The system controller 110 may sound an alarm (e.g., visual, audio, etc.) within the occupant's location, indicate to the occupant that there is an emergency (e.g., flash the lights), provide a message indicating the emergency via the occupant's mobile device 182, etc. The system controller 110 may confirm whether each of the occupants are out of a space during an emergency situation.

The system controller 110 may calculate the utilization of different spaces (e.g., rooms) based on occupant tracking (e.g., tracking of occupants using their respective mobile devices). For example, the system controller 110 may determinate the capacity in a space of a building and/or calculate the number of occupants (e.g., via their mobile device 182) in the space over time. The system controller 110 may determine rooms that are underutilized and rooms that are over utilized, based on this information. For example, the system controller 110 may determine that a conference room is underutilized if the conference room has a capacity of ten people and is being used by two people for one hour a week. Management may make personnel decisions based on the occupant tracking information. The occupant tracking information may be refined using time of day, day of the week, etc., information. For example, the system controller 110 may use occupant tracking information to determine whether additional space is required, whether particular spaces are being underutilized, etc.

The system controller 110 may determine the status of one or more rooms (e.g., hotel rooms), based on information received from a mobile device 182. For example, a user may register their mobile device 182 with a hotel when checking in. The system controller 110 may determine the status of the user's hotel room (e.g., do not disturb, ready for service, unsold room, etc.), based on whether the mobile device 182 is in the room. For example, the system controller 110 may determine the rooms within the hotel that are "ready for service," based on a detection of the mobile device 182 within a room. For example, the system controller 110 may illuminate a light outside of the room, send a message to a mobile device 182 of the cleaning staff, display a status indicator on a computing device, etc., to indicate that a room within the hotel is "ready for service," "not to be disturbed," "unsold," etc.

The present application has been described with reference to the system controller 110 interacting between the control-source devices (e.g., the input devices) and the control-target devices (e.g., the load control devices). However, the control-source devices may transmit digital message directly to the control-target devices. While the present disclosure has been described with reference to the mobile device 182 and/or the input devices determining their locations, any of the control devices (e.g., including the load control devices) may be configured to determine their own location. The system controller 110 may determine the location of any of the control devices.

As described herein, the mobile device 182 may include one or more sensing devices for sensing biometric data that defines the physical condition (e.g., behavior, movement, comfort, and/or health) of the occupant 180 when the mobile device 182 is a wearable wireless device. The system controller 110 may automatically control the load control devices (e.g., the dimmer switch 120, the LED drivers 130, the plug-in load control devices 140, the motorized window treatments 150, and/or the temperature control devices 160) and/or electrical loads in response to the parameters measured by the sensing devices of the mobile device 182. For example, the system controller 110 may turn on or off or adjust the intensity of the lighting loads 122 and/or the LED light sources 132 in response to the parameters measured by the sensing devices of the mobile device 182. The system controller 110 may adjust the color temperature of the LED light sources 132 in response to the parameters measured by the sensing devices of the mobile device 182. The system controller 110 may adjust the color temperature of the LED light sources 132 based on the number of occupants in a room and/or the preferences of the occupants within the room. The system controller 110 may adjust the position of the motorized window treatments 150 in response to the parameters measured by the sensing devices of the mobile device 182. The system controller 110 may adjust the setpoint temperature of the HVAC system 162 and/or turn a fan of the HVAC system on or off in response to the parameters measured by the sensing devices of the mobile device 182.

The system controller 110 may control the load control devices in response to the parameters measured by the sensing devices of the mobile device 182 to attempt to adjust the state or physical condition of the occupant 180. For example, if the system controller 110 determines that the stress level of the occupant 180 is increasing, the system controller 110 may decrease the intensity of the lighting loads 122, adjust the color temperature of the LED light sources 132 to a cooler color, open the motorized window treatments 150, decrease the setpoint temperature of the HVAC system 162, and/or cause the speaker 146 to play soothing music or sounds. If the system controller 110 determines that the occupant 180 is quickly moving around the space, the system controller may increase the intensity of the lighting loads 122, and/or decrease the setpoint temperature of the HVAC system 162.

The amount that each load control device and/or electrical load is controlled may be dependent upon the levels of the parameters measured by the sensing devices of the mobile device 182 (e.g., the exact stress level of the occupant 180). The system controller 110 may determine how to control the load control devices and/or the electrical loads in response to the unique identifier of the mobile device 182. For example, the unique identifier may indicate a medical condition of the occupant 180, such that the system controller 110 is able to control the load control devices and/or the electrical loads in response to the parameters measured by the sensing devices of the mobile device 182.

The system controller 110 may control the load control devices and/or the electrical loads to save energy in response to the parameters measured by the sensing devices of the mobile device 182. The system controller 110 may determine that the occupant has just fallen asleep in response to the parameters measured by the sensing devices of the mobile device 182 and to turn off and or reduce the amount of power delivered to one or more of the electrical loads.

The system controller 110 may control the load control devices and/or electrical loads in response to determining that the occupant 180 is asleep or awake. For example, the system controller 110 may determine that the occupant has just fallen asleep in response to the parameters measured by the sensing devices of the mobile device 182 and to turn off and/or reduce the amount of power delivered to one or more of the electrical loads (e.g., such as turning off the lighting loads 122, the television 144, a radio, etc.) The system controller 110 may adjust the setpoint temperature of the HVAC system 162 in response to the body temperature of the occupant 180 to ensure comfort of the occupant while sleeping. The system controller 110 may determine that the occupant is asleep and is starting to wake up in response to the parameters measured by the sensing devices of the mobile device 182 and to then slowly increase the intensity of the lighting loads 122, adjust the color temperature of the LED light sources 132, and/or raise the motorized window treatments 150 to improve the experience of the occupant 180 while waking up.

The system controller 110 may control (e.g., automatically control) the load control devices and/or electrical loads to provide an alarm or warning in response to the parameters measured by the sensing devices of the mobile device 182. For example, the system controller 110 may blink the lighting loads 122 and/or generate an alarm with the speaker 146 in the vicinity of the occupant 180 and/or a caregiver of the occupant. For example, the system controller 110 may determine an abnormal condition with the occupant 180 while sleeping, and to blink the lighting loads 122 and/or generate an alarm with the speaker 146 in the vicinity of a caregiver of the occupant 180. The system controller 110 may be configured to blink the lighting loads 122 and/or adjust the color temperature of the LED light sources 132 in the vicinity of the occupant 180 to indicate the location of the occupant to the caregiver.

Figure 8B:
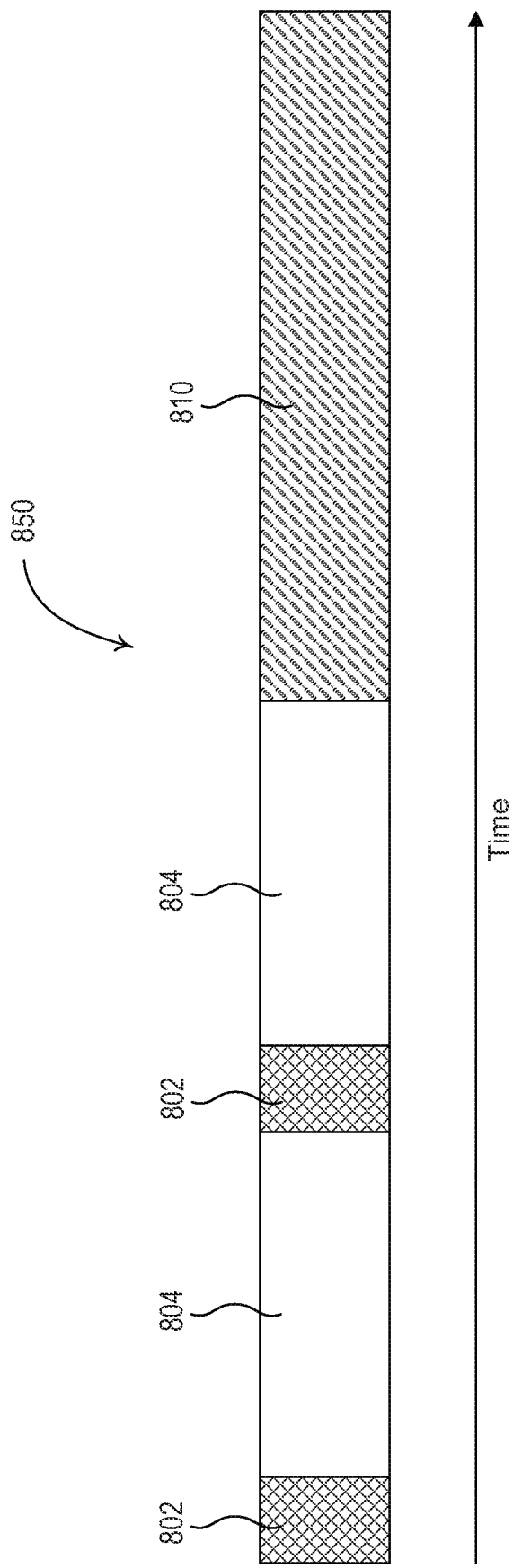
Figure 8C:
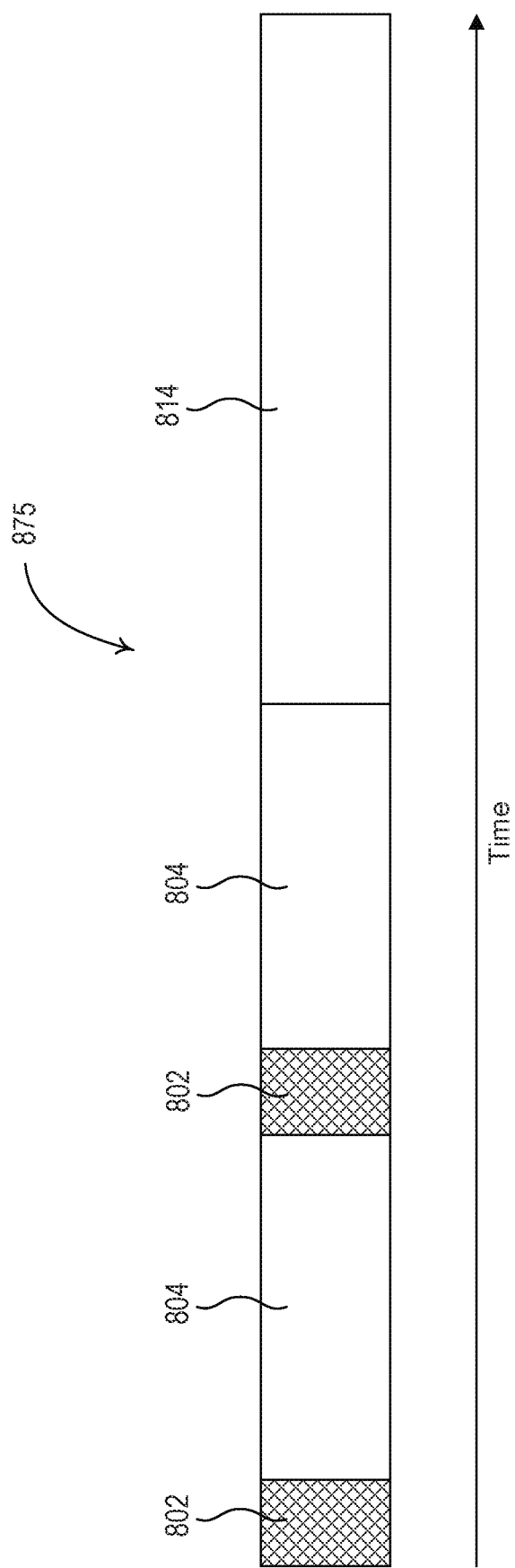

FIGS. 8A, 8B, and 8C are timing diagrams illustrating example communication modes in which a control device (e.g., system controller, control-source device, and/or control-target device) and/or the beacon transmitting device may communicate over a period of time when commissioning and/or controlling the load control system 100. For example, using a periodic beacon communication mode (as illustrated in timing diagram 800 shown in FIG. 8A), the control device and/or the beacon transmitting device may transmit messages during a beacon signal transmission time period 802 and/or a load control communication time period 804. During the beacon signal transmission time period 802, the control device and/or the beacon transmitting device may transmit one or more beacon signals (e.g., using one or more protocols, such as the Bluetooth® protocol, the Bluetooth® low energy beacon protocol, VLC protocol, etc.). During the load control communication time period 804, the control device and/or the beacon transmitting device may transmit and/or receive messages on the same or another communication protocol (e.g., a standard protocol, such as the Bluetooth® two-way communication protocol; a proprietary communication protocol, such as the Clear Connect® protocol; etc.). When the control device and/or the beacon transmitting device operates in the load control communication time period 804, the control device and/or the beacon transmitting device may transmit and/or receive commands (e.g., commands that include load control instructions and/or association instructions) for performing operations in the load control system 100.

The control device and/or the beacon transmitting device may provide one-way communication during the beacon signal transmission time period 802. For example, during the beacon signal transmission time period 802, the control device and/or the beacon transmitting device may transmit digital messages which may include identification information of the control device and/or the beacon transmitting device. The digital messages may include a location associated with the control device and/or the beacon transmitting device. During the load control communication time period 804, the control device and/or the beacon transmitting device may transmit and/or receive digital messages. For example, during the load control communication time period 804, the control device and/or the beacon transmitting device may transmit and/or receive messages so that the association of the control devices may be performed. Though FIG. 2 shows a number of transitions between the beacon signal transmission time period 802 and the load control communication time period 804, any number of transitions may be performed.

The control device and/or the beacon transmitting device may switch between time periods automatically. For example, the control device and/or the beacon transmitting device may periodically switch from the beacon signal transmission time period 802 to the load control communication time period 804. The control device and/or the beacon transmitting device may switch from the load control communication time period 804 to the beacon signal transmission time period 802 so that the control device and/or the beacon transmitting device may transmit beacon signals and the association of the control devices may be performed. For example, the control device and/or the beacon transmitting device may switch from the load control communication time period 804 to the beacon signal transmission time period 802 so that one or more control devices may be associated with one or more other devices (e.g., system controllers, remote control devices, etc.). After configuration of the load control system has been completed, the control device and/or the beacon transmitting device may switch from the load control communication time period 804 to the beacon signal transmission time period 802 so that control devices may transmit beacon signals to allow for control of the load control system has completed.

In an example, the control device and/or the beacon transmitting device may communicate via a protocol (e.g., the Bluetooth® low energy protocol) during the beacon signal transmission time period 802 and may return to the protocol (e.g., the Clear Connect® protocol) being used during the load control communication time period 804. The beacon signal transmission time period 802 and the load control communication time period 804 may be configurable. For example, the mobile device 182 may receive an indication of a change to the beacon signal transmission time period 802 and/or the load control communication time period 804. The indication of the change to the beacon signal transmission time period 802 and/or the load control communication time period 804 may be communicated (e.g., directly or via the system controller) to the control device and/or the beacon transmitting device.

The control device and/or the beacon transmitting device may switch from the beacon signal transmission time period 802 to the load control communication time period 804 (and vice-versa), based on an instruction. The instruction may be from a mobile device 182 (e.g., upon receipt of a button press on the mobile device 182). The instruction may be performed by one or more devices. For example, the control device and/or the beacon transmitting device may switch from the beacon signal transmission time period 802 and/or the load control communication time period 804, based on an instruction from another control device (e.g., system controller 110, control-source device, and/or control-target device).

FIG. 8B shows a timing diagram 850 in which the control device and/or the beacon transmitting device may switch between a periodic beacon communication mode and a continuous two-way configuration mode. While operating in the periodic beacon communication mode, the control device and/or the beacon transmitting device may transmit messages during a beacon signal transmission time period 802 and a load control communication time period 804 (e.g., as also shown in FIG. 8A). The control device and/or the beacon transmitting device may transmit one or more beacons via one or more protocols (e.g., a Bluetooth® low energy protocol, VLC protocol, etc.) within the beacon signal transmission time period 802. The control device and/or the beacon transmitting device may transmit and/or receive communications in the same protocol or another protocol during the load control communication time period 804.

The control device may transition to the continuous two-way configuration mode, in which the control device may transmit messages during a continuous two-way configuration time period 360. The continuous two-way configuration time period 810 may be a dedicated two-way communication mode for transmitting and receiving digital messages, or a dedicated one-way communication mode for transmitting or receiving digital messages. For example, while in the continuous two-way configuration time period 810, the control device may send and/or receive digital messages via the Bluetooth® protocol, the Bluetooth® low-energy protocol, the NFC protocol, the Wi-Fi® protocol, the ZIGBEE® protocol, etc. During the continuous two-way configuration time period 810, the control device and/or the beacon transmitting device may communicate using the same protocol as used during the beacon signal transmission time period 802, or a protocol that is different than the protocol used during the beacon signal transmission time period 802. The control device and/or the beacon transmitting device may switch from the periodic beacon communication mode to the continuous two-way configuration mode so that the control devices may be configured (e.g., after association is completed). For example, the control device and/or the beacon transmitting device may switch from the periodic beacon communication mode to continuous two-way configuration mode so that the operational settings (e.g., high-end trim, low-end trim, fade rates, etc.) of the control devices may be configured.

The control device and/or the beacon transmitting device may switch to the continuous two-way configuration mode, based on a time and/or based on an instruction (e.g., an instruction received during the load control communication time period 804 or an additional time period immediately following the beacon signal transmission time period 802). The instruction may be received from the mobile device 182 and/or from one or more other devices. The instruction from the mobile device 182 may be in response to a beacon signal received by a control device. For example, after the mobile device 182 receives the beacon signal, the mobile device 182 may display a beacon detection screen. A background application of the mobile device 182 may be displayed in the foreground of the mobile device 182 as a beacon detection screen. An encrypted passcode that corresponds to the control device sending the beacon may be determined. For example, the mobile device 182 may determine an encrypted passcode that corresponds to the control device that sent the beacon. The mobile device 182 may use the unique identifier of the control device, received within the beacon, to determine the corresponding passcode. For example, the mobile device 182 may use a lookup table and the unique identifier of the control device to determine the passcode.

The control device may receive a scan request directly from the mobile device 182 and/or the control device may receive the scan request via an intermediary device (e.g., a system controller, such as system controller 110). The scan request may include encrypted passcode information, based on the unique identifier provided by the control device. The control device may determine whether the received encrypted passcode is correct. If the control device determines that the encrypted passcode is correct, the control device may switch to the continuous two-way configuration time period 810. The continuous two-way configuration time period 810 may be a dedicated Bluetooth® low-energy mode, for example, in which the control device may communicate using the Bluetooth® low-energy protocol. The Bluetooth® low-energy protocol may be a two-way communication protocol. For example, the control device may receive digital messages via the Bluetooth® low-energy protocol and/or send digital messages via the Bluetooth® low-energy protocol, if the control device is communicating using the two-way communication protocol.

Though FIG. 8B shows an example transition between the periodic beacon transmission mode (e.g., including the beacon signal transmission time period 802 and the load control communication time period 804), and the continuous two-way configuration mode (e.g., including the continuous two-way configuration time period 810), any number of transitions may be performed. For example, the control device may transition back to the periodic beacon transmitting mode after the continuous two-way configuration mode, such that the beacon signal transmission time period 802 and the load control communication time period 804 may occur after the continuous two-way configuration time period 810.

The control device and/or the beacon transmitting device may transmit digital messages in an association mode during the configuration of the load control system. For example, the system controller 110 may cause the control device and/or the beacon transmitting device to operate in an association mode of operation during the configuration procedure of the load control system. The system controller 110 may cause the control device to operate in the association mode of operation after an association procedure of the control device capable of transmitting beacon signals. The association procedure may include the system controller 110 receiving information (e.g., location, identifiers, etc.) of the load control devices to access and/or control the associated load control devices. The mobile device 182 may send digital messages via the system controller 110 to control the load control devices associated with the unique identifier. For example, the system controller 110 may transmit a digital message to the control device to cause the control device to enter the association mode of operation after the association procedure. The control device may cease transmitting beacon signals and/or transmit the beacon signals at a lower power level in the association mode of operation, for example, to consume less power and/or reduce RF traffic on the short-range RF communication link. Ceasing to transit the beacon signals and/or transmitting the beacon signals at a lower power level may hinder the mobile device 182 from hearing the beacon signals from that control device. For example, ceasing to transit the beacon signals and/or transmitting the beacon signals at a lower power level may hinder the mobile device 182 from hearing the beacon signals from that control device while trying to associate other control devices during the configuration procedure.

FIG. 8C shows a timing diagram 875 in which the control device and/or the beacon transmitting device may switch between a periodic beacon communication mode and a continuous two-way control mode. While operating in the periodic beacon communication mode, the control device and/or the beacon transmitting device may transmit messages during a beacon signal transmission time period 802 and a load control communication time period 804. The control device may transition to the continuous two-way control mode, in which the control device may transmit messages during a continuous two-way control time period 814. The control device and/or the beacon transmitting device may transition to the continuous two-way control time period 814 so that the control devices may be controlled (e.g., controlled via the system controller 110 and/or the mobile device 182) after the association procedure is completed. The control device and/or the beacon transmitting device may communicate in the same protocol during the load control communication time period 804 and during the continuous two-way time period 814. For example, while in the continuous two-way control time period 814, the control device and/or the beacon transmitting device may send and/or receive digital messages via an RF protocol (e.g., a standard RF protocol, such as NFC, Wi-Fi®, ZIGBEE®; and/or a proprietary RF protocol, such as the Clear Connect® protocol, etc.).

The control device and/or the beacon transmitting device may switch to the continuous two-way control mode, based on a time and/or based on an instruction (e.g., received during the load control communication time period 804 or during the continuous two-way configuration time period 810 shown in FIG. 8B). The instruction may be from the mobile device 182 and/or from one or more other devices. The instruction from the mobile device 182 may be in response to a beacon signal received by a control device. For example, after the mobile device 182 receives the beacon signal, the mobile device 182 may display a beacon detection screen. A background application of the mobile device 182 may be displayed in the foreground of the mobile device 182 as a beacon detection screen. An encrypted passcode that corresponds to the control device sending the beacon may be determined. For example, the mobile device 182 may determine an encrypted passcode that corresponds to the control device that sent the beacon. The mobile device 182 may use the unique identifier of the control device, received within the beacon, to determine the corresponding passcode. For example, the mobile device 182 may use a lookup table and the unique identifier of the control device to determine the passcode.

The control device may receive a scan request directly from the mobile device 182 and/or the control device may receive the scan request via an intermediary device (e.g., a system controller, such as system controller 110). The scan request may include encrypted passcode information, based on the unique identifier provided by the control device. The control device may determine whether the received encrypted passcode is correct. If the control device determines that the encrypted passcode is correct, the control device may switch to the continuous two-way control time period 814. The continuous two-way control time period 814 may be a dedicated ClearConnect® mode. For example, the control device may switch its mode to a ClearConnect® mode that communicates using the ClearConnect® protocol. While in the ClearConnect® mode, the control device may communicate with one or more other control devices that communicate via the ClearConnect® protocol. The control device may switch between a Bluetooth® low-energy protocol and a ClearConnect® protocol.

Though FIG. 8C shows an example transition between the periodic beacon transmission mode (e.g., including the beacon signal transmission time period 802 and the load control communication time period 804), and the continuous two-way control mode (e.g., including the continuous two-way control time period 814), any number of transitions may be performed. After the continuous two-way configuration time period 810 (in FIG. 8B), the control device and/or the beacon transmitting device may transition to the periodic beacon communication mode (e.g., including the beacon signal transmission time period 802 and the load control communication time period 804), as shown in FIG. 8A, and/or the control device and/or the beacon transmitting device may transition to the continuous two-way control mode (e.g., including the continuous two-way control time period 814), as shown in FIG. 8C. After the continuous two-way control time period 814 (in FIG. 8C), the control device and/or the beacon transmitting device may transition to the periodic beacon communication mode (e.g., including the beacon signal transmission time period 802 and the load control communication time period 804), as shown in FIG. 8A, and/or the control device and/or the beacon transmitting device may transition to the continuous two-way configuration mode (e.g., including the continuous two-way configuration time period 810), as shown in FIG. 8B.

The control device may transmit in the continuous two-way control time period 814 when the mobile device 182 snaps onto the control device. For example, the control device may switch to the continuous two-way control time period 814 when the mobile device 182 snaps onto the control device so that the control device can transmit or receive instructions for configuring/controlling the load control system. As the mobile device 182 snaps onto the control device, the control device may no longer beacon.

Figure 9:
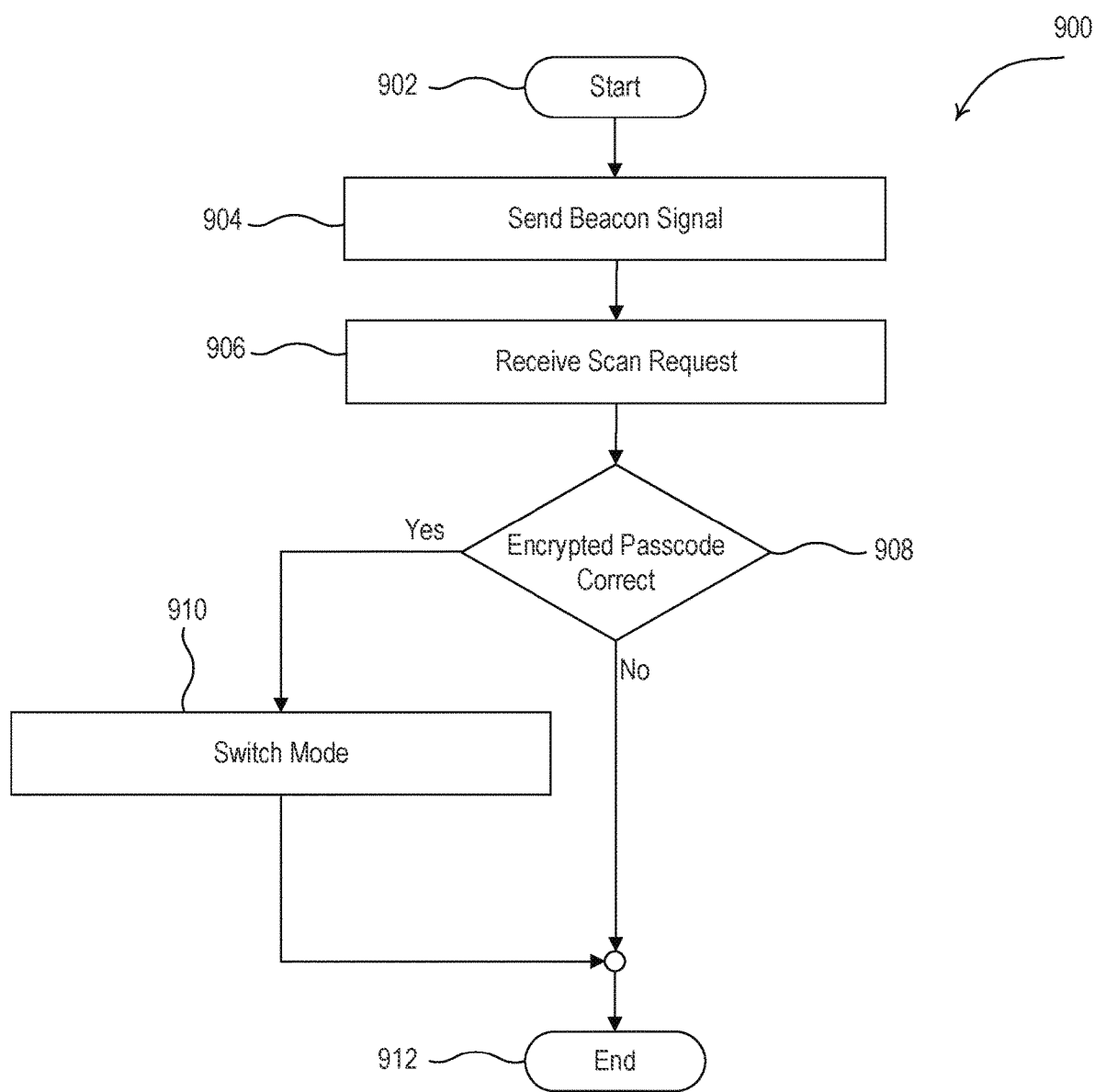
FIG. 9 is a flowchart of an example procedure for switching communication protocols based on a received passcode.

FIG. 9 is a flowchart of an example procedure 900 for switching the mode of a control device, based on the control device receiving a passcode. At 902, the example procedure 900 may start. At 904, a beacon signal may be sent. For example, a control device may send a beacon signal. The beacon signal may contain information (e.g., a unique identifier of the control device, such as a serial number of the control device). The beacon signal may be sent for a duration of time. The beacon signal may be a Bluetooth® low-energy signal. The beacon signal may be received by a mobile device. After the mobile device receives the beacon signal, the mobile device may display a beacon detection screen. For example, a background application of the mobile device may be displayed in the foreground of the mobile device as a beacon detection screen. An encrypted passcode that corresponds to the control device sending the beacon may be determined. For example, the mobile device may determine an encrypted passcode that corresponds to the control device that sent the beacon. The mobile device may use the unique identifier of the control device, received within the beacon, to determine the corresponding passcode. For example, the mobile device may use a lookup table and the unique identifier of the control device to determine the passcode.

At 906, the control device may receive a scan request. The control device may receive the scan request directly from the mobile device and/or the control device may receive the scan request via an intermediary device (e.g., a system controller, such as system controller 110). The scan request may include information. For example, the scan request may include encrypted passcode information, based on the unique identifier provided by the control device. The control device may perform a determination, at 908. For example, the control device may determine whether the received encrypted passcode is correct. If the encrypted passcode is incorrect, the procedure may end, at 912. If, at 908, the control device determines that the encrypted passcode is correct, the control device may switch its mode, at 910. For example, if the control device determines that the encrypted passcode is correct, the control device may switch its mode to a Bluetooth® low-energy mode. The Bluetooth® low-energy mode may be a dedicated Bluetooth® low-energy mode, for example, in which the control device may communicate using the Bluetooth low-energy protocol. The Bluetooth® low-energy protocol may be a two-way communication protocol. For example, the control device may receive digital messages in Bluetooth® low-energy and/or send digital messages in Bluetooth® low-energy, if the control device is communicating using the two-way communication protocol. The control device may also, or alternatively, switch its mode to a ClearConnect® mode. For example, the control device may switch its mode to a ClearConnect® mode that communicates using the ClearConnect® protocol. While in the ClearConnect® mode, the control device may communicate with one or more other control devices that communicate via the ClearConnect® protocol. The control device may switch between a Bluetooth® low-energy protocol (e.g., beacon mode and/or two-way communication mode) and a ClearConnect® protocol.

Figure 10:
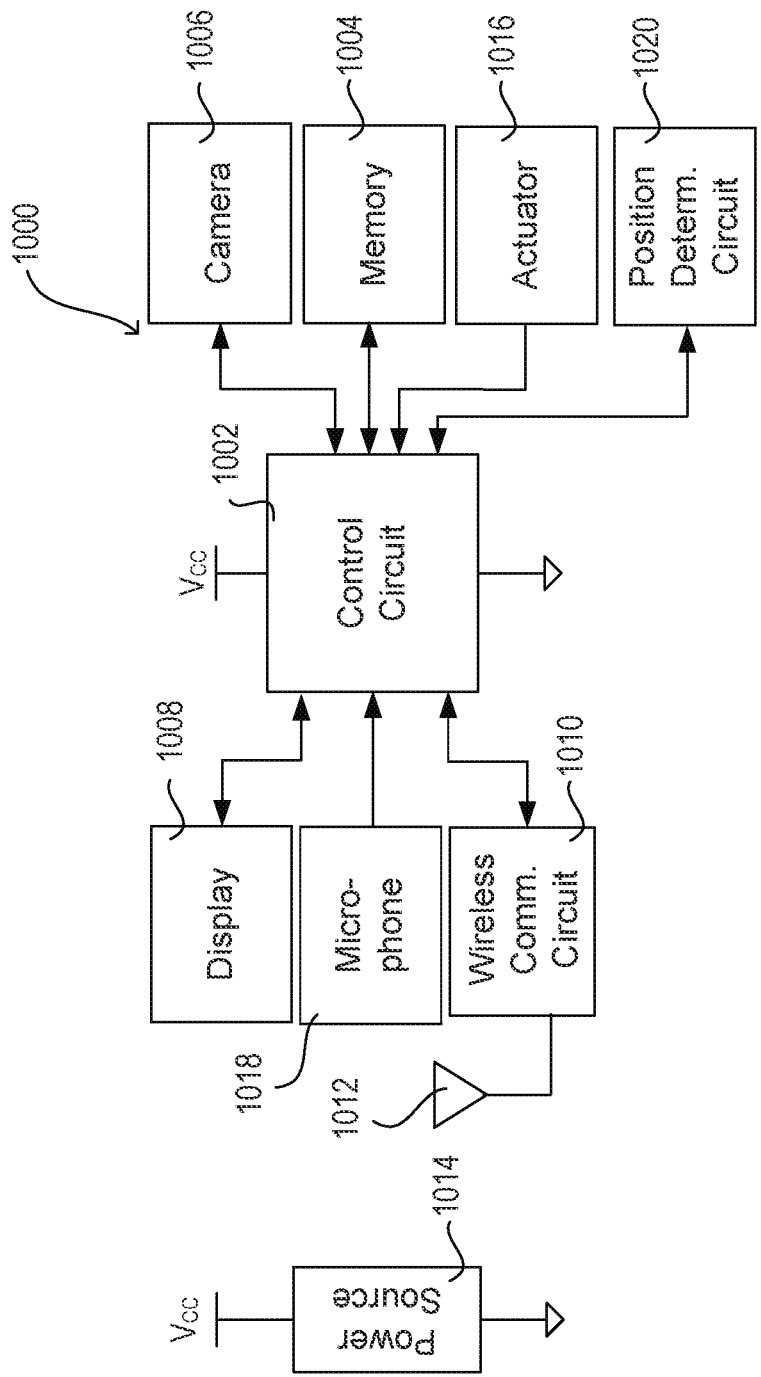
FIG. 10 is a block diagram illustrating an example mobile device.

FIG. 10 is a block diagram illustrating an example network device 1000 as described herein. The network device may be a mobile device (such as mobile device 182, shown in FIG. 1A. The network device 1000 may include a control circuit 1002 for controlling the functionality of the network device 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 1002 may perform signal coding, data processing, power control, image processing, input/output processing, and/or any other functionality that enables the network device 1000 to perform as described herein.

The control circuit 1002 may store information in and/or retrieve information from the memory 1004. The memory 1004 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory.

The network device 1000 may include a visible light sensor 1006 that may be in communication with the control circuit 1002. The visible light sensor may include a camera, such as a digital camera or other optical device capable of generating images or videos (e.g., image sequences) for being captured at the network device 1000 using visible light. The visible light sensor may include a light capable of flashing, modulating, or turning on/off in response to signals received from the control circuit. Though the visible light sensor 1006 is shown in FIG. 10, the network device 1000 may include a photo sensor and/or other device capable of recognizing visible light communications.

The network device 1000 may include a wireless communication circuit 1010 for wirelessly transmitting and/or receiving information. For example, the wireless communications circuit 1010 may include an RF transceiver for transmitting and receiving RF communication signals via an antenna 1012, or other communications module capable of performing wireless communications. Wireless communications circuit 1010 may be in communication with the control circuit 1002 for communicating information to and/or from the control circuit 1002. For example, the wireless communication circuit 1010 may send information from the control circuit 1002 via network communication signals. The wireless communication circuit 1010 may send information to the control circuit 1002 that are received via network communication signals.

The control circuit 1002 may be in communication with a display 1008. The display may provide information to a user in the form of a graphical and/or textual display. The control circuit 1002 may signal the display 1008, or portions thereof, to modulate or turn on/off to communicate information from the display 1008. The communication between the display 1008 and the control circuit 1002 may be a two way communication, as the display 1008 may include a touch screen module capable of receiving information from a user and providing such information to the control circuit 1002.

The network device 1000 may include an actuator 1016. The control circuit 1002 may be responsive to the actuator 1016 for receiving a user input. For example, the control circuit 1002 may be operable to receive a button press from a user on the network device 1000 for making a selection or performing other functionality on the network device 1000. The actuator 1016 may include a biometric sensor that defines a physical condition (e.g., behavior, movement, comfort, and/or health) of the user. The biometric sensor may include, for example, a fingerprint scanner, an eye scanner, and a heart rate monitor capable of identifying heart rate information for the user.

The network device 1000 may include a microphone 1018. The control circuit 1002 may receive audio signals via the microphone 1018.

The network device 1000 may include one or more position determining circuits 1020. The position determining circuit 1020 may be capable of determining the position and/or movement of the network device 1000. Position determining circuit 1020 may include a global positioning system (GPS) circuit, a gyroscope, and/or an accelerometer. The GPS circuit may be capable of receiving GPS information. The control circuit 1020 may be capable of determining the GPS coordinates of the network device 1000 based on the GPS information received via the GPS circuit. The gyroscope may identify an orientation of the network device 1000. For example, the control circuit 1002 may be capable of determining the orientation of the network device 1000 based on the orientation information received via the gyroscope. The accelerometer may identify an acceleration of the network device 1000. The accelerometer may be used (e.g., used by the control circuit 1002) to detect magnitude and/or direction of the acceleration of the network device 1000, such as in the form of a vector, an orientation of the network device 1000, and/or vibrations of the network device 1000.

Each of the modules within the network device 1000 may be powered by a power source 1014. The power source 1014 may include an AC power supply or DC power supply, for example. The power source 1014 may generate a DC supply voltage $V_{CC}$ for powering the modules within the network device 1000.

Figure 11:
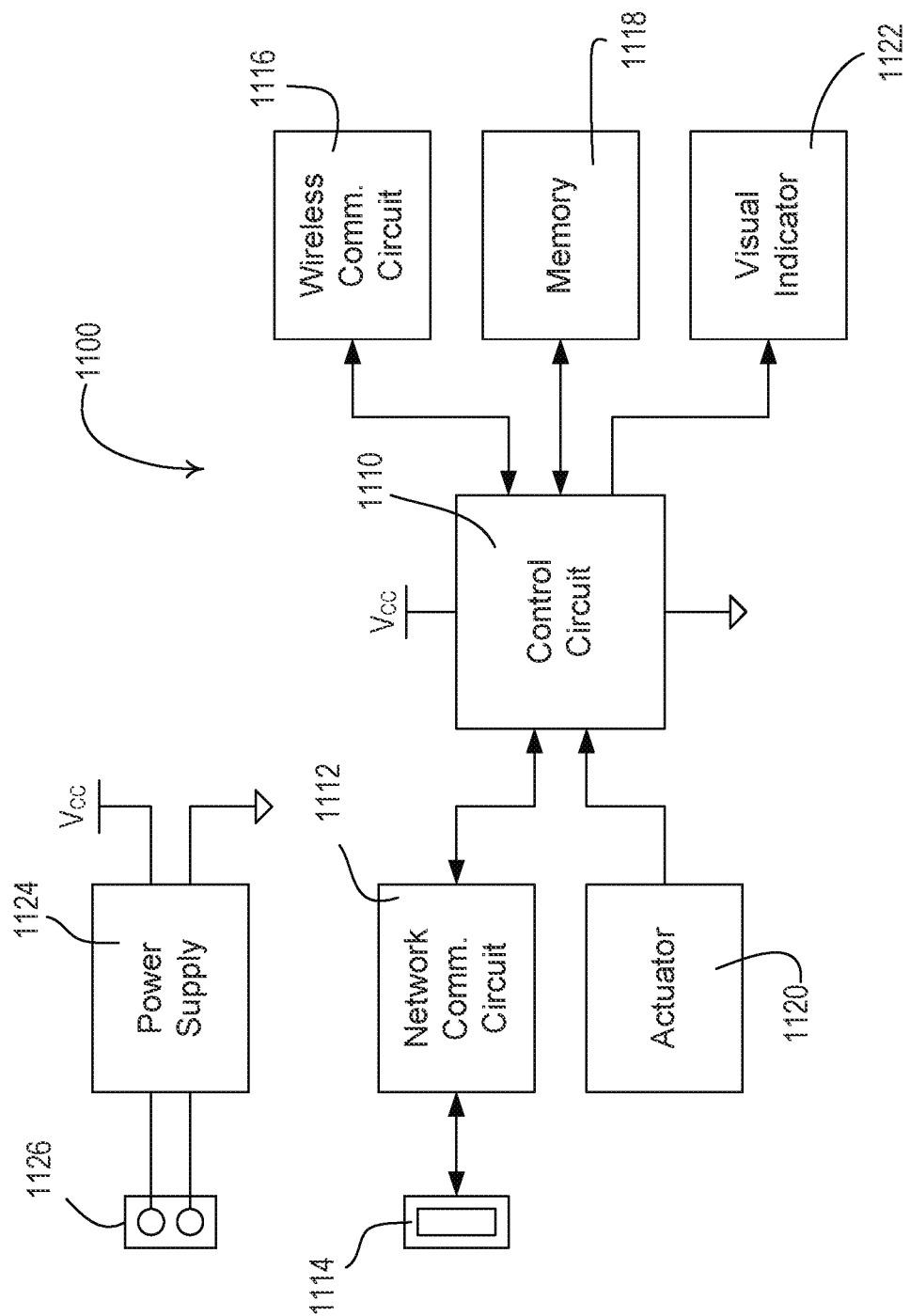
FIG. 11 is a block diagram of an example system controller.

FIG. 11 is a block diagram of an example system controller 1100. The system controller 1100 may include a control circuit 1110, which may include one or more of a processor (e.g., a microprocessor), a microcontroller, a programmable logic device (PLD), a field programmable gate array (FPGA), an application specific integrated circuit (ASIC), or any suitable processing device. The control circuit 1110 may perform signal coding, data processing, image processing, power control, input/output processing, and/or any other functionality that enables the system controller 1100 to perform as described herein. The system controller 1100 may include a network communication circuit 1112 that may be coupled to a network connector 1114 (e.g., an Ethernet jack), which may be adapted to be connected to a wired digital communication link (e.g., an Ethernet communication link) for allowing the control circuit 1110 to communicate with network communication devices on a network. The network communication circuit 1112 may be wirelessly connected to the network, e.g., using Wi-Fi® technology to transmit and/or receive network communication signals.

The system controller 1110 may include a wireless communication circuit 1116, for example, including an RF transceiver coupled to an antenna for transmitting and/or receiving RF communication signals. The wireless communication circuit 1116 may communicate using a proprietary protocol (e.g., the ClearConnect® protocol). The control circuit 1110 may be coupled to the wireless communication circuit 1116 for transmitting digital messages via the RF communication signals, for example, to control the load control devices in response to digital messages received via the network communication circuit 1112. The control circuit 1110 may receive digital messages, for example, from the load control devices and/or other control-source devices.

The control circuit 1110 may be responsive to an actuator 1120 for receiving a user input. For example, the control circuit 1110 may be operable to associate the system controller 1100 with one or more devices of a load control system in response to actuations of the actuator 1120. The system controller 1100 may include additional actuators to which the control circuit 1110 may be responsive.

The control circuit 1110 may store information in and/or retrieve information from the memory 1118. The memory 1118 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1110 may access the memory 1118 for executable instructions and/or other information that may be used by the system controller 1100. The control circuit 1110 may store the device identifiers of the devices to which the system controller 1100 is associated in the memory 1118. The control circuit 1110 may access instructions in the memory 1118 for transmitting instructions and/or performing other functions described herein.

The system controller 1100 may include a power supply 1124 for generating a DC supply voltage $V_{CC}$ for powering the control circuit 1110, the network communication circuit 1112, the wireless communication circuit 1116, the memory 1118, the visual indicator 1122, and/or other circuitry of the system controller 1100. The power supply 1124 may be coupled to a power supply connector 1126 (e.g., a USB port) for receiving a supply voltage (e.g., a DC voltage) and/or for drawing current from an external power source.

Figure 12:
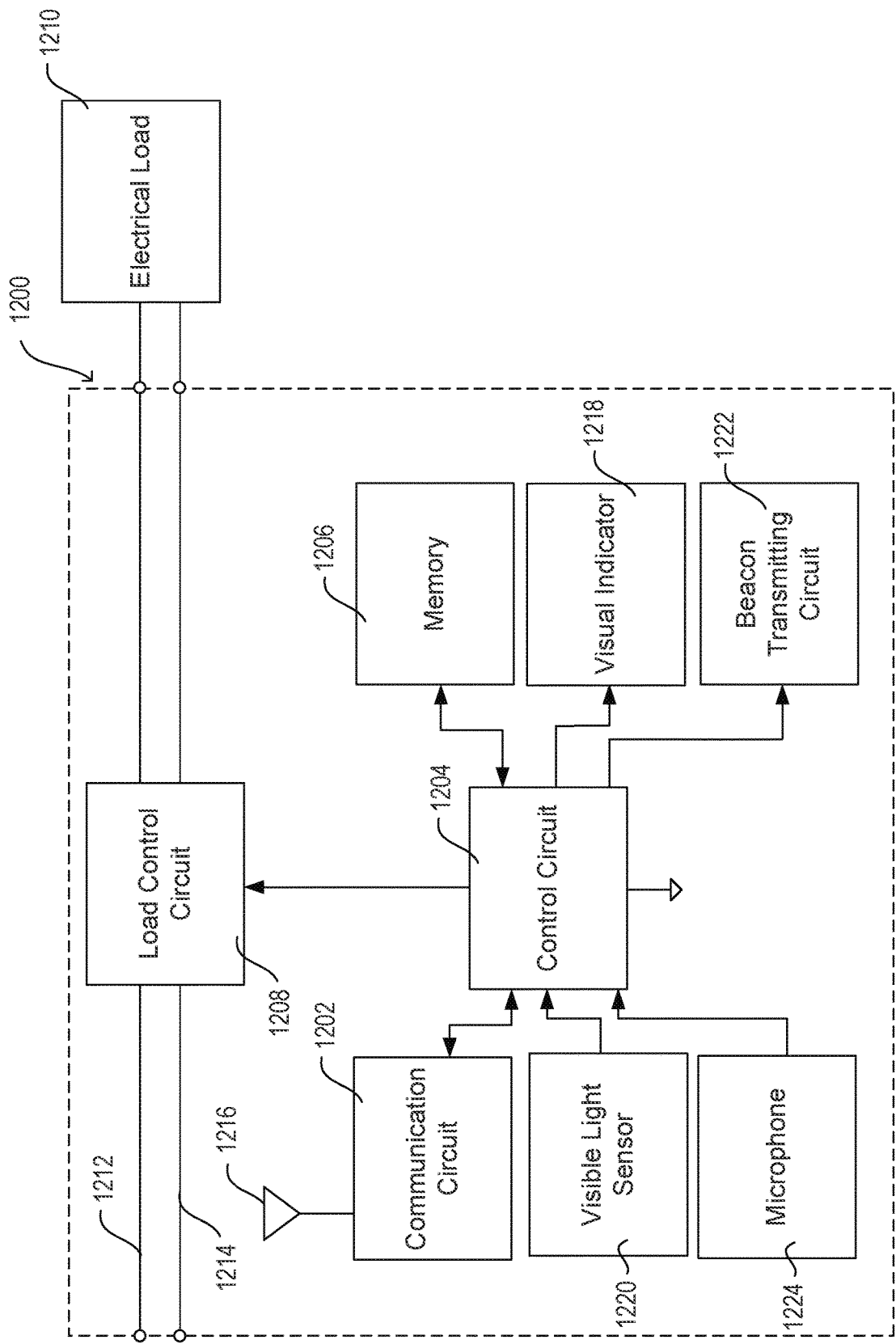
FIG. 12 is a block diagram illustrating an example load control device.

FIG. 12 is a block diagram illustrating an example load control device 1200. The load control device 1200 may be a control-target device, such as a lighting control device, for example. The load control device 1200 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 1200 may include a communication circuit 1202. The communication circuit 1202 may include an RF receiver, an RF transceiver, or other communication module capable of performing wired and/or wireless communications. The wireless communications may be performed via an antenna 1216.

The communication circuit 1202 may be in communication with a control circuit 1204. The control circuit 1204 may include one or more general purpose processors, special purpose processors, conventional processors, digital signal processors (DSPs), microprocessors, integrated circuits, a programmable logic device (PLD), application specific integrated circuits (ASICs), or the like. The control circuit 1204 may perform signal coding, data processing, power control, input/output processing, or any other functionality that enables the load control device 1200 to perform as described herein.

The control circuit 1204 may store information in and/or retrieve information from a memory 1206. For example, the memory 1206 may maintain a device database of associated device identifiers, instructions for modulating an electrical load 1210 to communicate visible light communications, and/or other executable instructions for performing as described herein. The memory 1206 may include a non-removable memory and/or a removable memory. The load control circuit 1208 may receive instructions from the control circuit 1204 and may control the electrical load 1210 based on the received instructions. For example, the control circuit 1204 may use the load control circuit 1208 to modulate the electrical load 1210 according to instructions received to transmit visible light communications (e.g., to transmit a beacon). The load control circuit 1208 may receive power via the hot connection 1212 and the neutral connection 1214 and may provide an amount of power to the electrical load 1210. The electrical load 1210 may include a lighting load or any other type of electrical load.1018

The control circuit 1204 may illuminate a visual indicator 1218 to provide feedback to a user. For example, the control circuit 1204 may blink or strobe the visual indicator 1218 to indicate a fault condition. The control circuit 1204 may be operable to illuminate the visual indicator 1218 different colors to indicator different conditions or states of the system controller 1200. The visual indicator 1218 may be illuminated by, for example, one or more light-emitting diodes (LEDs). The visual indicator 1218 may be modulated to transmit a visible light communication, as described herein. The system controller 1200 may include more than one visual indicator.

The control circuit 1204 may receive information from the visible light sensor 1220. The visible light sensor 1220 may detect visible light communications transmitted by other devices, such as a mobile device (e.g., camera flashes, flashes of the display, etc.) or other load control devices, for example. The visible light sensor 1220 may include a photo sensor, a camera, an infrared (IR) sensor, and/or another device for recognizing the visible light communications.

The control circuit 1204 may cause a short-range communication circuit 1222 to transmit beacons. The short-range communication circuit may communicate beacons via RF communication signals, for example. The control circuit 1204 may receive audio signals via the microphone 1224.

Figure 13:
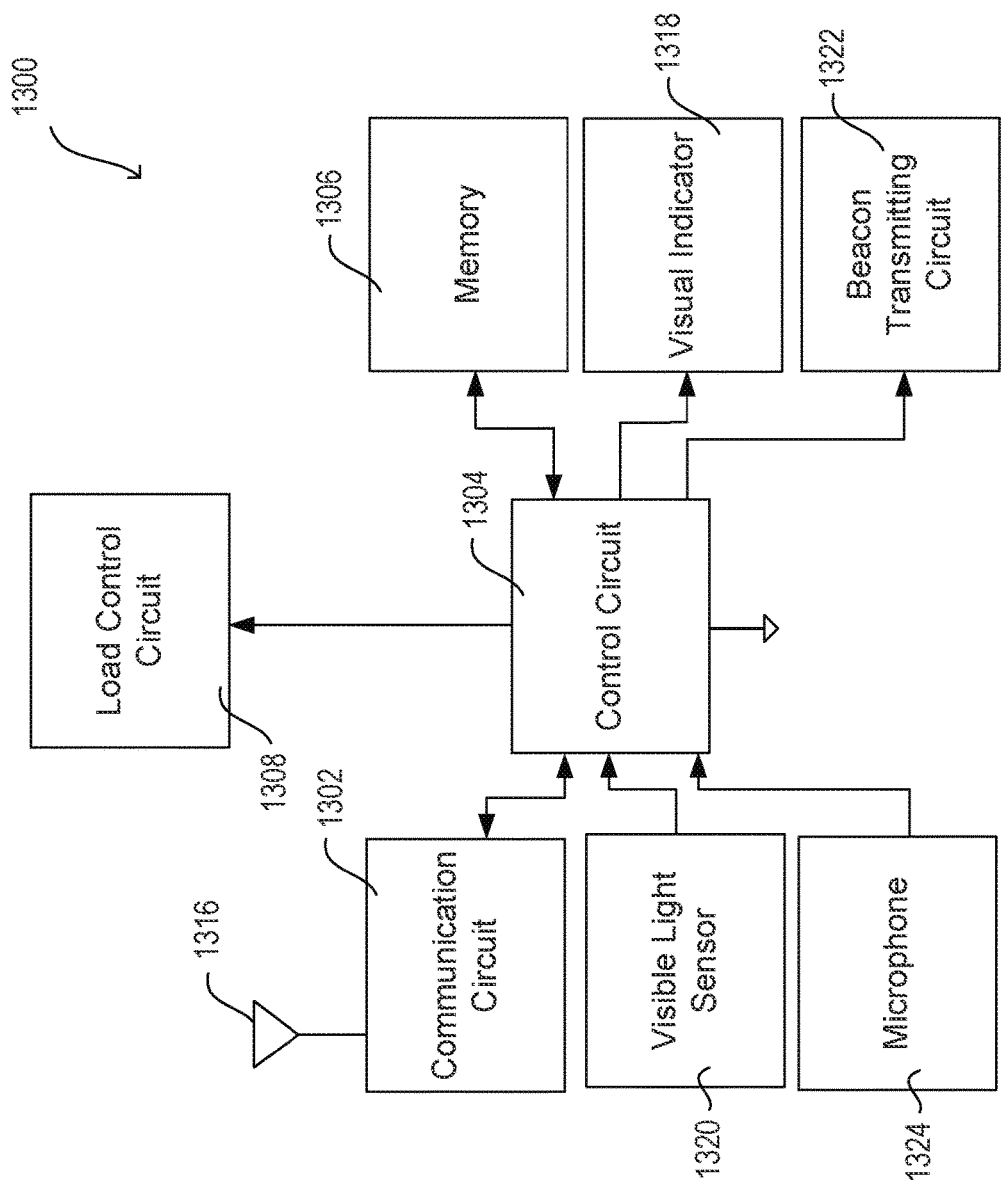
FIG. 13 is a block diagram illustrating an example beacon device.

FIG. 13 is a block diagram illustrating an example beacon device 1300. The beacon device 1300 may be a control-source device, a control-target device, a system controller, and/or a mobile device. The beacon device 1300 may include a communication circuit 1302. The communication circuit 1302 may include an RF receiver, an RF transceiver, or other communication module capable of performing wired and/or wireless communications. The wireless communications may be performed via an antenna 1316.

The communication circuit 1302 may be in communication with a control circuit 1304. The control circuit 1304 may include one or more general purpose processors, special purpose processors, conventional processors, digital signal processors (DSPs), microprocessors, integrated circuits, a programmable logic device (PLD), application specific integrated circuits (ASICs), or the like. The control circuit 1304 may perform signal coding, data processing, power control, input/output processing, or any other functionality that enables the beacon device 1300 to perform as described herein.

The control circuit 1304 may store information in and/or retrieve information from a memory 1306. The memory 1306 may include a non-removable memory and/or a removable memory. The load control circuit 1308 may receive instructions from the control circuit 1304. The control circuit 1304 may illuminate a visual indicator 1318 to provide feedback to a user. For example, the control circuit 1304 may blink or strobe the visual indicator 1318 to indicate a fault condition. The visual indicator 1318 may be illuminated by, for example, one or more light-emitting diodes (LEDs). The visual indicator 1318 may be modulated to transmit a visible light communication, as described herein. The system controller 1300 may include more than one visual indicator.

The control circuit 1304 may receive information from the visible light sensor 1320. The visible light sensor 1320 may detect visible light communications transmitted by other devices, such as a mobile device (e.g., camera flashes, flashes of the display, etc.) or other load control devices, for example. The visible light sensor 1320 may include a photo sensor, a camera, an infrared (IR) sensor, and/or another device for recognizing the visible light communications.

The control circuit 1304 may cause a short-range communication circuit 1322 to transmit beacons. The short-range communication circuit may communicate beacons via RF communication signals, for example. The control circuit 1304 may receive audio signals via the microphone 1324.

Although features and elements are described herein in particular combinations, each feature or element may be used alone or in any combination with the other features and elements. Each feature or element described herein may be configured to be implemented in one or more control devices and/or network devices described herein. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. An electrical load control system, comprising:
   one or more control devices, each of the one or more control devices including:
      communication interface circuitry to transmit a beacon signal that includes data; and
   a system controller communicatively coupled to the at least one control device, the system controller including:
      first communication interface circuitry to communicatively couple to a network device via a wireless first network;
      second communication interface circuitry to communicatively couple to each of the one or more control devices via a second network; and
      control circuitry, the control circuitry to:
         receive, via the first communication interface circuitry, a first signal from the network device;
         wherein the first signal includes data associated with each beacon transmitted by a respective one of the one or more control devices;
         determine a location of the network device using the received data associated with each beacon transmitted by respective ones of the one or more control devices; and
         identify at least one control device associated with the determined location of the network device.

2. The electrical load control system of claim 1, the system controller control circuitry to further:
   cause a transmission of the at least one identified control device to the network device via the first communication interface circuitry.

3. The electrical load control system of claim 2, the system controller control circuitry to further:
   receive from the network device via the first communication interface circuitry, an instruction associated with at least one identified control device.

4. The electrical load control system of claim 3, wherein to receive the instruction associated with the at least one identified control device, the system controller control circuitry to further:
   receive from the network device via the first communication interface circuitry, a command to adjust an operating parameter of the at least one identified control device.

5. The electrical load control system of claim 4, the system controller control circuitry to further:
   cause a transmission of the received command to the at least one identified control device via the second communication interface circuitry.

6. The electrical load control system of claim 2 wherein to identify the at least one control device associated with the determined location of the network device, the system controller control circuitry to further:
   identify a plurality of control devices associated with the determined location of the network device.

7. The electrical load control system of claim 6, the system controller control circuitry to further:
   receive from the network device via the first communication interface circuitry, an instruction associated with the plurality of identified control devices.

8. The electrical load control system of claim 7 wherein to receive the instruction associated with the plurality of identified control devices, the system controller control circuitry to further:
   receive from the network device via the first communication interface circuitry, a command to associate two or more control devices included in the plurality of identified control devices.

9. The electrical load control system of claim 8, the system controller control circuitry to further:
   cause a transmission of the received command to associate two or more control devices included in the plurality of identified control devices to each of the plurality of control devices via the second communication interface circuitry.

10. The electrical load control system of claim 7, wherein to receive the instruction associated with the plurality of identified control devices, the system controller control circuitry to further:
    receive from the network device via the first communication interface circuitry, a command to adjust an operating parameter of at least one of the plurality of identified control devices.

11. The electrical load control system of claim 10, the system controller control circuitry to further:
  transmit, the received command adjust the operating parameter of the at least one of the plurality of identified control devices to each of the plurality of identified control devices via the second communication interface circuitry.

12. The electrical load control system of claim 1 wherein to receive the first signal that includes the data associated with each beacon transmitted by respective ones of the one or more control devices from the network device, the system controller control circuitry to further:
  receive, from the network device via the first communication interface circuitry, the first signal;
    wherein the first signal includes data representative of a unique identifier associated with each beacon transmitted by respective ones of the one or more control devices.

13. The electrical load control system of claim 12 wherein to receive the first signal that includes the data associated with each beacon transmitted by respective ones of the one or more control devices from the network device, the system controller control circuitry to further:
  receive, from the network device via the first communication interface circuitry, the first signal;
    wherein the first signal further includes data representative of a received signal strength (RSSI) of each beacon transmitted by respective ones of the one or more control devices.

14. The electrical load control system of claim 13 wherein to determine the location of the network device using the received data associated with each beacon transmitted by respective ones of the one or more control devices, the system controller control circuitry to further:
  determine the location of the network device using the received signal strength (RSSI) of each beacon transmitted by respective ones of the one or more control devices.

15. An electrical load control method, comprising:
  transmitting, by each of one or more control devices, a beacon signal that includes data;
  receiving by system controller control circuitry via first communication interface circuitry, a first signal from a network device,
    wherein the signal includes data associated with each beacon transmitted by a respective one of the one or more control devices;
  determining, by the system controller control circuitry, a location of the network device using the received data associated with each beacon transmitted by respective ones of the one or more control devices; and
  identifying, by the system controller control circuitry at least one control device included in the one or more control devices associated with the determined location of the network device.

16. The electrical load control method of claim 15, further comprising:
  causing by the system controller control circuitry, a transmission of the at least one identified control device to the network device via the first communication interface circuitry.

17. The electrical load control method of claim 16, further comprising:
  receiving by the system controller control circuitry from the network device, an instruction associated with the at least one identified control device via the first communication interface circuitry.

18. The electrical load control method of claim 17, wherein receiving the instruction associated with the at least one identified control device further comprises:
  receiving by the system controller control circuitry from the network device, a command to adjust an operating parameter of the at least one identified control device via first communication interface circuitry.

19. The electrical load control method of claim 18, further comprising:
  causing by the system controller control circuitry, a transmission of the received command to the at least one identified control device via the second communication interface circuitry.

20. The electrical load control method of claim 16 wherein identifying the at least one control device associated with the determined location of the network device, further comprises:
  identifying by the system controller control circuitry, a plurality of control devices associated with the determined location of the network device.

21. The electrical load control method of claim 20, further comprising:
  receiving by the system controller control circuitry from the network device, an instruction associated with the plurality of identified control devices via the first communication interface circuitry.

22. The electrical load control method of claim 21 wherein receiving the instruction associated with the plurality of identified control devices, further comprises:
  receiving by the system controller control circuitry from the network device, a command to associate two or more control devices included in the plurality of identified control devices via the first communication interface circuitry.

23. The electrical load control method of claim 22, further comprising:
  causing by the system controller control circuitry, a transmission of the received command to associate two or more control devices included in the plurality of identified control devices to at least a portion of the plurality of control devices via the second communication interface circuitry.

24. The electrical load control method of claim 21, wherein receiving the instruction associated with the plurality of identified control devices, further comprises:
  receiving by the system controller control circuitry from the network device, a command to adjust an operating parameter of at least one of the plurality of identified control devices via the first communication interface circuitry.

25. The electrical load control method of claim 24, further comprising:
  causing by the system controller control circuitry, a transmission of the received command to the at least one of the plurality of identified control devices via the second communication interface circuitry.

26. The electrical load control method of claim 15 wherein receiving the first signal from the network device, the signal including data associated with each beacon transmitted by a respective one of the one or more control devices, further comprises:
  receiving by the system controller control circuitry from the network device, the first signal via the first communication interface circuitry;

wherein the first signal includes data representative of a unique identifier associated with each beacon transmitted by a respective ones of the one or more control devices.

27. The electrical load control method of claim 26 wherein receiving, from the network device, the first signal that includes the data associated with each beacon transmitted by respective ones of the one or more control devices, further comprises:
receiving by the system controller control circuitry from the network device, the first signal via the first communication interface circuitry;
wherein the first signal further includes data representative of a received signal strength (RSSI) of each beacon transmitted by a respective one of the one or more control devices.

28. The electrical load control method of claim 27 wherein determining the location of the network device using the received data associated with each beacon transmitted by respective ones of the one or more control devices, further comprises:
determining by the system controller control circuitry, the location of the network device using the received signal strength (RSSI) of each beacon transmitted by a respective ones of the one or more control devices.

29. A non-transitory, machine-readable, storage device that includes instructions that, when executed by system controller control circuitry, cause the system controller control circuitry to:
receive via first communication interface circuitry, a first signal from a network device,
wherein the signal includes data associated with each beacon transmitted by a respective one of one or more control devices;
determine a location of the network device using the received data associated with each beacon transmitted by respective ones of the one or more control devices; and
identify at least one control device included in the one or more control devices associated with the determined location of the network device.

30. The non-transitory, machine-readable, storage device of claim 29 wherein the instructions, when executed by the system controller control circuitry further cause the system controller control circuitry to:
cause a transmission of the at least one identified control device to the network device via the first communication interface circuitry.

31. The non-transitory, machine-readable, storage device of claim 30 wherein the instructions, when executed by the system controller control circuitry further cause the system controller control circuitry to:
receive from the network device via the first communication interface circuitry, an instruction associated with the at least one identified control device.

32. The non-transitory, machine-readable, storage device of claim 31, wherein the instructions that cause the system controller control circuitry to receive the instruction associated with the at least one identified control device further cause the system controller control circuitry to:
receive from the network device via the first communication interface circuitry, a command to adjust an operating parameter of the at least one identified control device.

33. The non-transitory, machine-readable, storage device of claim 32 wherein the instructions, when executed by the system controller control circuitry further cause the system controller control circuitry to:
cause a transmission of the received command to the at least one identified control device via second communication interface circuitry.

34. The non-transitory, machine-readable, storage device of claim 30 wherein the instructions that cause the system controller control circuitry to identify the at least one control device associated with the determined location of the network device, further cause the system controller control circuitry to:
Identify a plurality of control devices associated with the determined location of the network device.

35. The non-transitory, machine-readable, storage device of claim 34 wherein the instructions, when executed by the system controller control circuitry further cause the system controller control circuitry to:
receive from the network device via the first communication interface circuitry, an instruction associated with the plurality of identified control devices.

36. The non-transitory, machine-readable, storage device of claim 35 wherein the instructions that cause the system controller control circuitry to receive the instruction associated with the plurality of identified control devices, further cause the system controller control circuitry to:
receive from the network device via the first communication interface circuitry, a command to associate two or more control devices included in the plurality of identified control devices.

37. The non-transitory, machine-readable, storage device of claim 36 wherein the instructions, when executed by the system controller control circuitry further cause the system controller control circuitry to:
cause a transmission of the received command to associate two or more control devices included in the plurality of identified control devices to at least a portion of the plurality of control devices via the second communication interface circuitry.

38. The non-transitory, machine-readable, storage device of claim 35, wherein the instructions that cause the system controller control circuitry to receive the instruction associated with the plurality of identified control devices, further cause the system controller control circuitry to:
receive from the network device via the first communication interface circuitry, a command to adjust an operating parameter of at least one of the plurality of identified control devices.

39. The non-transitory, machine-readable, storage device of claim 38 wherein the instructions, when executed by the system controller control circuitry further cause the system controller control circuitry to:
cause a transmission of the received command to the at least one of the plurality of identified control devices via second communication interface circuitry.

40. The non-transitory, machine-readable, storage device of claim 39 wherein the instructions that cause the system controller control circuitry to receive the first signal that includes the data associated with each beacon transmitted by respective ones of the one or more control devices, further cause the system controller control circuitry to:
receive from the network device via the first communication interface circuitry, the first signal, wherein the first signal includes data representative of a unique identifier associated with each beacon transmitted by a respective ones of the one or more control devices.

41. The non-transitory, machine-readable, storage device of claim 40 wherein the instructions that cause the system controller control circuitry to receive the first signal that includes the data associated with each beacon transmitted by respective ones of the one or more control devices, further cause the system controller circuitry to:
    receive from the network device via the first communication interface circuitry, the first signal, wherein the first signal further includes data representative of a received signal strength (RSSI) of each beacon transmitted by a respective one of the one or more control devices.

42. The non-transitory, machine-readable, storage device of claim 41 wherein the instructions that cause the system controller control circuitry to determine the location of the network device using the received data associated with each beacon transmitted by respective ones of the one or more control devices, further cause the system controller control circuitry to:
    determine the location of the network device using the received signal strength (RSSI) of each beacon transmitted by a respective ones of the one or more control devices.

\* \* \* \* \*